United States Patent [19]
Dempsey

[11] Patent Number: 6,139,040
[45] Date of Patent: Oct. 31, 2000

[54] SHEAR-BONDED MOLDED BICYCLE COMPONENT ASSEMBLY

[76] Inventor: Douglas E. Dempsey, 6208 Feldspar Ct., Bellvue, Colo. 80512

[21] Appl. No.: 09/082,462

[22] Filed: May 20, 1998

Related U.S. Application Data

[63] Continuation-in-part of application No. 08/724,070, Sep. 30, 1996, Pat. No. 5,762,405, which is a continuation of application No. 08/306,780, Sep. 15, 1994, abandoned.

[51] Int. Cl.[7] .............................. B62K 19/06; B62K 19/16
[52] U.S. Cl. ........................................ 280/288.3; 301/64.7
[58] Field of Search ............................ 280/281.1, 288.3; 301/64.2, 64.3, 64.7, 95, 96, 97, 98

[56] References Cited

U.S. PATENT DOCUMENTS

| | | | |
|---|---|---|---|
| Re. 35,335 | 9/1996 | Calfee | 280/281.1 |
| 3,656,531 | 4/1972 | Ross et al. | 301/63 |
| 3,695,728 | 10/1972 | Haussels | 301/63 |
| 3,695,729 | 10/1972 | Schwerdhofer | 301/63 |
| 3,862,779 | 1/1975 | Jayne | 301/64.7 X |
| 3,985,392 | 10/1976 | Bergmann et al. | 301/64.7 |
| 3,998,457 | 12/1976 | Dempsey et al. | 273/73 |
| 4,043,603 | 8/1977 | Bergmann et al. | 301/63 |
| 4,114,953 | 9/1978 | Baumgartner | 301/63 |
| 4,252,378 | 2/1981 | DeBolt et al. | 301/63 |
| 4,344,655 | 8/1982 | Pellegrino | 301/2.5 |
| 4,358,162 | 11/1982 | Schneider et al. | 301/63 |
| 4,376,554 | 3/1983 | Schumacher | 301/63 |
| 4,511,184 | 4/1985 | Schauf et al. | 301/63 |
| 4,527,839 | 7/1985 | Fujitaka et al. | 301/64.7 X |
| 4,530,543 | 7/1985 | Keane | 301/63 |
| 4,580,846 | 4/1986 | Johnson et al. | 301/63 |
| 4,613,146 | 9/1986 | Sharp et al. | 280/281 B |
| 4,622,731 | 11/1986 | Kjell | 301/64.7 X |
| 4,639,046 | 1/1987 | Oleff et al. | 301/63 |
| 4,732,428 | 3/1988 | Monte | 301/64.3 |
| 4,793,659 | 12/1988 | Oleff et al. | 301/63 |
| 4,818,034 | 4/1989 | Djerf | 301/64.7 |
| 4,828,781 | 5/1989 | Duplessis et al. | 264/250 |
| 4,835,857 | 6/1989 | Michelotti | 29/159 |
| 4,844,552 | 7/1989 | Tsygankov et al. | 301/63 |
| 4,856,801 | 8/1989 | Hollingsworth | 280/284 |

(List continued on next page.)

FOREIGN PATENT DOCUMENTS

| | | |
|---|---|---|
| 2380904 | 9/1978 | France . |
| 2485445 | 12/1981 | France . |
| 3315123A1 | 10/1984 | Germany . |
| 2153757A | 8/1985 | United Kingdom . |
| 2229975 | 10/1990 | United Kingdom . |
| WO96/08383 | 3/1996 | WIPO . |

OTHER PUBLICATIONS

Emaweld, Emabond Systems, Ashland Chemical Company, Copyright 1987 listed Head Wind. What Headwind?, Innovations in Composites, Inc., unknown publication date.

*Primary Examiner*—Russell D. Stormer
*Attorney, Agent, or Firm*—Santangelo Law Offices, P.C.

[57] ABSTRACT

A molded structural bicycle component design, such as wheels and frames, which may incorporate complementary halves and at least one shear bond to allow efficient manufacturing and assembly. The molded design which may be applied in a host of different applications, including a bicycle frame and wheel, where demanding loads exist in normal use. Details of the joint and its design are provided. Integral bearings, foam tire adaptations, symmetrically opposite designs, and compression bonding techniques are described. Various cross sections may be made at different stress areas. A method of inserting a reinforcing tube in various high stress areas is also described. A host of bonding techniques including the use of electromagnetically active material are accommodated by the designs. The design may include the use of spacers in the vicinity where methods of retention of accessories or components require compressing from both sides such as the wheels, head tube, bottom bracket, and suspension attachment. The invention may include semicircular boundaries of a wheel assembly so as to define a valve stem hole after assembly.

21 Claims, 26 Drawing Sheets

U.S. PATENT DOCUMENTS

| Patent No. | Date | Inventor | Class |
|---|---|---|---|
| 4,896,899 | 1/1990 | Lawrence | 301/64.7 X |
| 4,900,048 | 2/1990 | Derujinsky | 280/281.1 |
| 4,902,160 | 2/1990 | Jeng | 403/205 |
| 4,902,458 | 2/1990 | Trimble | 264/46.6 |
| 4,919,490 | 4/1990 | Hopkins et al. | 301/63 |
| 4,923,203 | 5/1990 | Trimble et al. | 280/288 |
| 4,986,949 | 1/1991 | Trimble | 264/258 |
| 4,995,675 | 2/1991 | Tsai | 301/63 |
| 5,018,795 | 5/1991 | Engerand et al. | 301/63 |
| 5,022,712 | 6/1991 | Woelfel et al. | 301/63 |
| 5,076,601 | 12/1991 | Duplessis | 280/281.1 |
| 5,080,385 | 1/1992 | Duplessis | 280/281.1 |
| 5,104,198 | 4/1992 | Prout et al. | 301/63 |
| 5,104,199 | 4/1992 | Sschlanger | 301/63 |
| 5,104,200 | 4/1992 | Prout et al. | 301/63 |
| 5,116,071 | 5/1992 | Calfee | 280/281.1 |
| 5,133,591 | 7/1992 | Skaggs et al. | 301/63 |
| 5,158,733 | 10/1992 | Trimble | 264/258 |
| 5,160,682 | 11/1992 | Calfee | 264/161 |
| 5,174,633 | 12/1992 | Kidd et al. | 301/64.7 |
| 5,184,874 | 2/1993 | Olson et al. | 301/64.7 |
| 5,188,384 | 2/1993 | van Raemdonck | 280/281.1 |
| 5,215,322 | 6/1993 | Enders | 280/231 |
| 5,229,047 | 7/1993 | Becker | 264/45.7 |
| 5,234,259 | 8/1993 | Nishimuro et al. | 301/64 |
| 5,246,275 | 9/1993 | Arredondo | 301/64.7 |
| 5,268,139 | 12/1993 | Sheeler | 264/328.8 |
| 5,271,784 | 12/1993 | Chen et al. | 156/156 |
| 5,318,742 | 6/1994 | You | 264/516 |
| 5,338,611 | 8/1994 | Lause et al. | 428/412 |
| 5,344,219 | 9/1994 | Adrian et al. | 301/64.1 |
| 5,368,358 | 11/1994 | Christensen | 297/215 |
| 5,368,804 | 11/1994 | Hwang et al. | 264/258 |
| 5,544,907 | 8/1996 | Lin et al. | 280/288.3 |
| 5,551,763 | 9/1996 | Alsman | 301/64.7 |
| 5,624,519 | 4/1997 | Nelson et al. | 156/245 |
| 5,676,780 | 10/1997 | Chen et al. | 156/79 |

 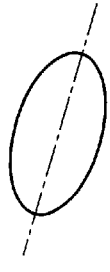 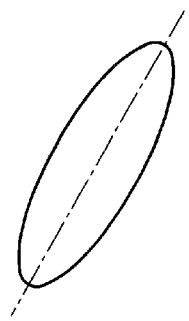
FIG.18A  FIG.18B  FIG.18C
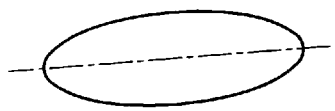 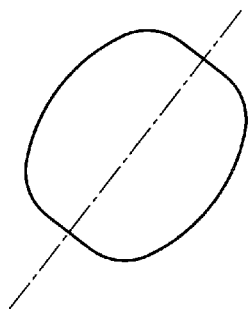 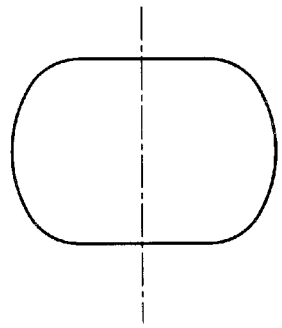
FIG.18D  FIG.18E  FIG.18F
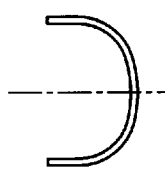 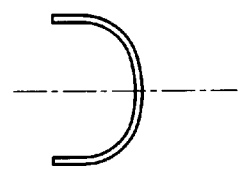 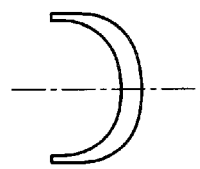
FIG.18J  FIG.18K  FIG.18L
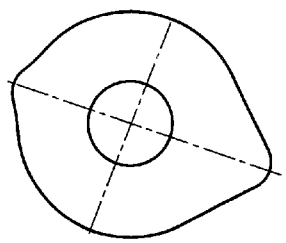
FIG.18N

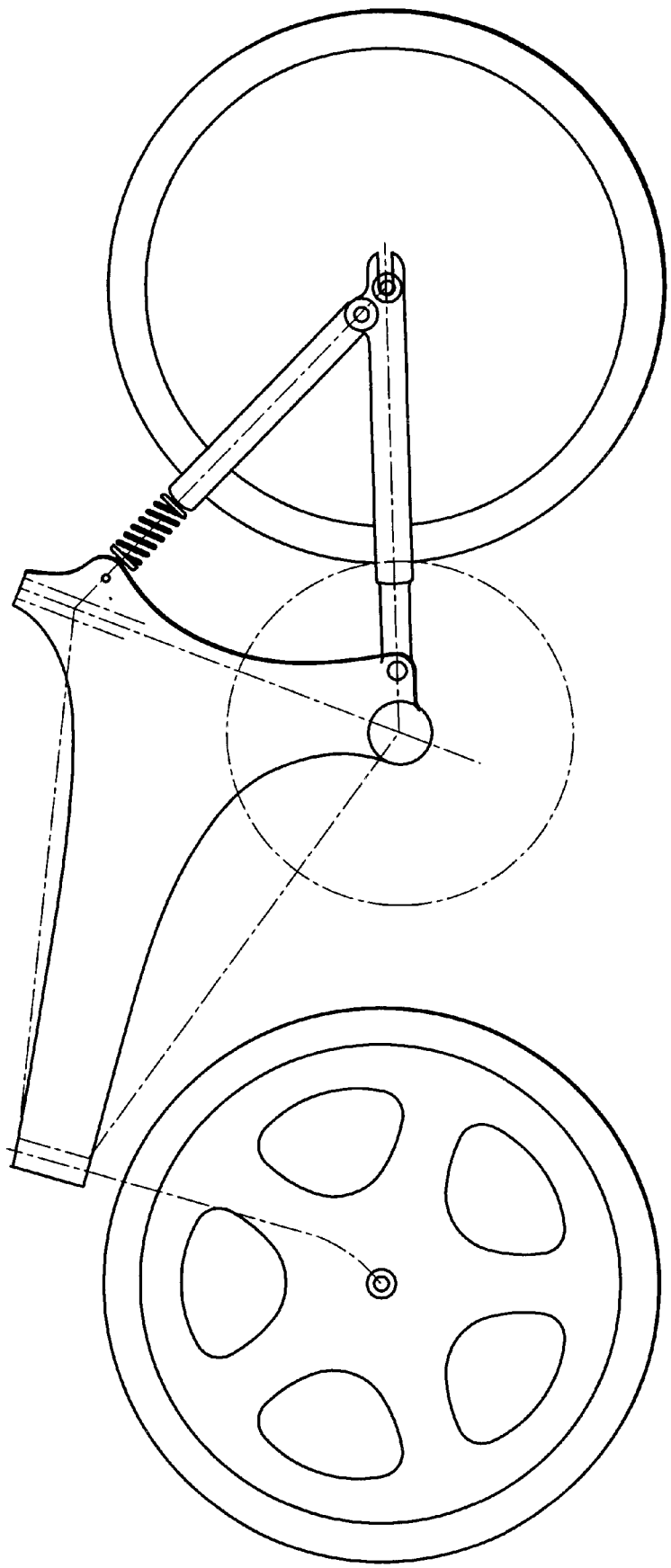

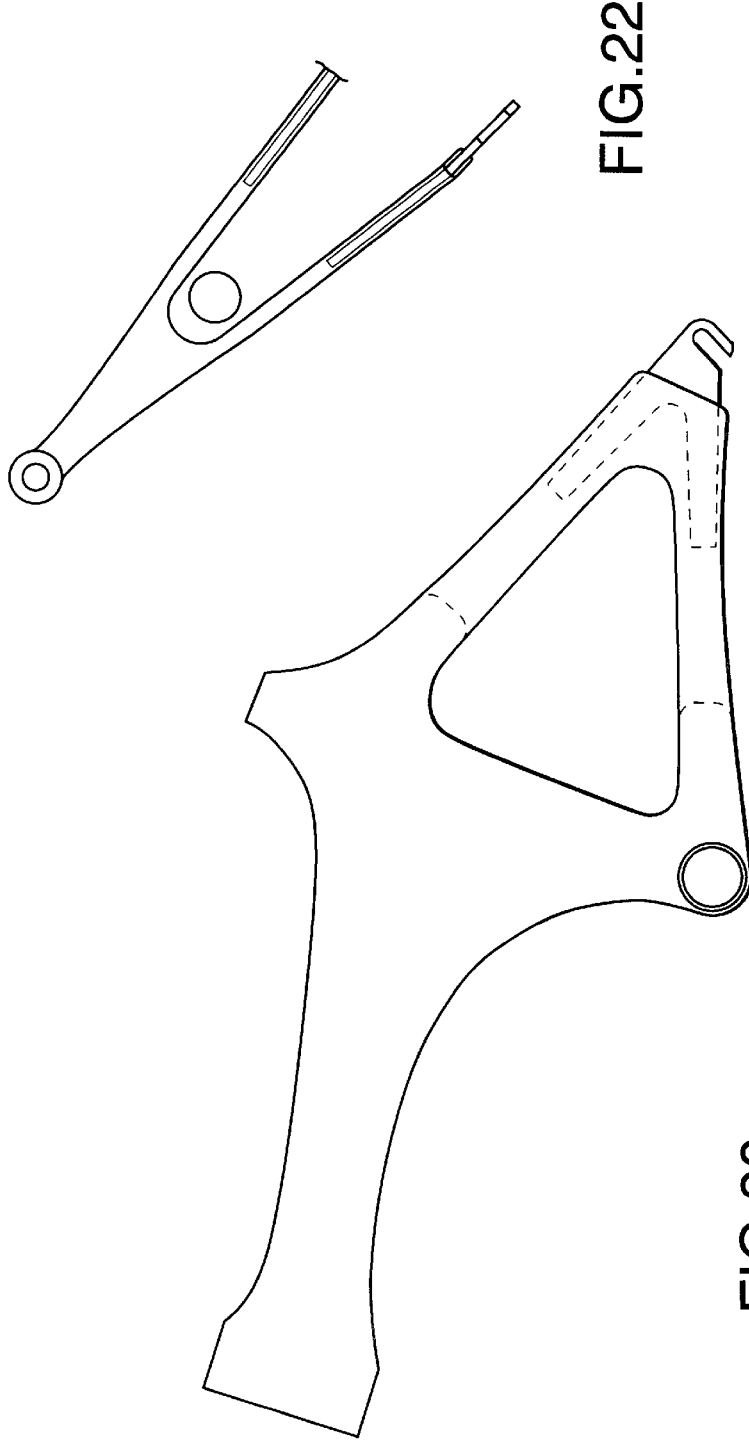
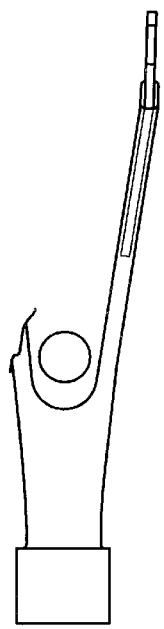
FIG.22
FIG.20
FIG.21

SHEAR-BONDED MOLDED BICYCLE COMPONENT ASSEMBLY

This is a continuation-in-part of application Ser. No. 08/724,070, filed Sep. 30, 1996, now issued as U.S. Pat. No. 5,762,405, which is a continuation of application Ser. No. 08/306,780 filed Sep. 15, 1994, now abandoned.

I. BACKGROUND OF THE INVENTION

This invention relates generally to molded bicycle components, including wheel designs, frames, and the like which join two halves together in order to form a single assembly. Specifically, the invention focuses upon bicycle component assembles which are efficient to manufacture and assemble, and yet which also have structural integrity similar to that of traditional bicycle components such as bicycle frames, handle bar designs, and wheel designs (including spoke designs) which are molded from multiple pieces and bonded into one assembly.

Regarding the wheel aspect, obviously, the wheel has been around for some time; it may even be considered the most fundamental invention of mankind. In spite of this history, the wheel is still the subject of continued improvement. These improvements are not merely efforts to "reinvent the wheel", they are actually incremental improvements which specifically adapt the wheel to different applications and make it more efficient for the end consumer. One of these fields, that of application to bicycles has also been known for years. This field is perhaps the one which is most subject to efforts at improved efficiency, be it in use, manufacture, or otherwise. Such improvements relate to the adaptations of new understandings and technologies in a manner which allows more efficient manufacture and utilization of such a well known item.

One of the more recent technologies which has been adapted for bicycle wheel applications is the technology of molding wheels. Improvements in this area have been fundamentally motivated by a pervasive desire to improve the efficiency with which such bicycle wheels are manufactured and yet maintain light weight.

The traditional bicycle wheel design involves a metal hub portion and a metal rim portion which are connected through numerous spokes. These spokes are usually each hand assembled and adjusted to achieve a perfectly circular and axially true wheel. The labor intense nature of such traditional spoke designs is one aspect which has great impact upon the cost of bicycle wheels. Obviously, by creating a design which is molded this significant cost impact can be avoided.

In spite of the rather obvious advantage of applying molding technology to this field, the technical challenges incidental to producing a molded wheel design have greatly limited the commercial acceptance of molded bicycle wheel designs in general. One of these challenges is the need to maintain light weight and yet strong structure. On the one hand, molded designs with solid spokes require structure to be located near the central axis, such as with an I-beam type cross section. This can limit the design characteristics. By analogy to I-beam construction, it can be more efficient to move structure off the axis, but this does not lend itself to the most simple molding processes. On the other hand, molding is more challenging for hollow items. Surprisingly, these and other technological hurdles have caused structural challenges for the field of bicycle wheels as its applications are actually one of the more demanding. Perhaps paradoxically, the challenges of applying molding technology have even lead toward increased expense for some designs.

Structurally, molded wheel designs have been faced with the challenge of allowing for two-part designs which can be joined together in a fashion that can withstand the significant stresses of such applications. In U.S. Pat. No. 4,344,655 to Pellegrino, a two-part molded wheel was disclosed in which the adjoining halves are held together through barbed designs which are molded as an integral part of each wheel half. While such a technique for joining the halves might work in low-stress applications such as the children's design as shown in that patent, singular fastening devices such as the barbs have an undesirable incident of concentrating stresses when the wheel is in use. Since the materials frequently used in molding items are not preferably materials which are particularly strong, this concentration of stresses has to some extent limited applications to items such as children's vehicles and the like.

Since these structural challenges are well known, several incremental improvements in more demanding applications such as the bicycle or motorcycle wheel have, of course, been proposed. In U.S. Pat. No. 4,527,839 to Fujitaka, it was proposed that a molded wheel be designed so as to be joined together through the use of both bonding and external fasteners. While for some designs such a technique might actually achieve sufficient structural integrity, obviously the assembly required for such designs degrades the efficiency which is a supposed hallmark of molded wheel designs in the first place. In addition, through its combination of bonding and fastening in order to join the two halves, the Fujitaka reference teaches away from the direction of merely bonding alone to join the two halves. Another challenge to joining wheel halves together was addressed in part in U.S. Pat. No. 3,695,728 to Haussels. In that patent, it was disclosed that the stresses near the center of the rim portion of the wheel are particularly acute. In order to deal with such stresses, the Haussels disclosure—again eschewing a bonded design—suggested placement of barb fasteners off the central plane to reduce forces. Among other aspects, this design represents not only a direction away from that taken by the present invention, but it is also an example of the seemingly narrow incremental improvements which are considered important when applied to such an invention which is as basic as the wheel.

Perhaps an even more extreme example of the challenging nature of joining two wheel halves together is demonstrated by a molded wheel design entitled "SPIN" by Innovations and Composites, Inc. This design (characterized by its inventors as "reinventing the wheel") goes to great lengths to avoid the two-part molded concept. Instead, it disclosed a single-piece molded design in which the hollow wheel is created through use of a lost core molding process, a process in which the core is melted out of the product after it has been molded. Although such a design does overcome the challenge of properly joining two or more parts together, it fails to achieve the most important goal of manufacturing efficiency. In fact the process is so expensive that the end wheel is significantly more expensive than traditional, albeit inefficient, spoke designs. Obviously, this direction does not achieve the low cost manufacturing efficiencies which are considered to be the hallmark of many molded wheel designs.

Regarding the bicycle frame aspect, some efforts have been made to functionally prepare and manufacture a molded bicycle frame. An example is U.S. Pat. No. 5,456,481 to Allsop. It shows two molded halves which may be joined. Little discussion is made of how to actually accomplish the joining of such pieces. The present invention discloses a novel method and system for securing a stable and strong shear bond joint, in addition to other features. Such a joint may be applicable in a variety of places throughout the bicycle components.

As the prior efforts demonstrate, although molded wheel designs have been known for over twenty years, and although there has long been an unsatisfied need for a satisfactory molded wheel design, until the present invention, such a design has not existed. A similar position may be taken for the other components, such as bicycle frames. For years, those skilled in the art have sought a molded wheel design which has been sufficiently easy and inexpensive to manufacture and assemble and which was also capable of satisfying the demanding structural needs of applications such as the bicycle field. Perhaps surprising in this regard is the fact that while the present invention merely implements arts which have long been available, until the present invention, those skilled in the art have not recognized the fact these could be implemented in a manner which would achieve these long felt needs. This was perhaps due to several factors. First, the attempts by those skilled in the art were directed away from designing the bond and wheel in a manner which was structurally appropriate. In some regards, they simply seemed to accept that bonding alone would not represent an adequate approach and may have even failed to understand that the problem lay in properly designing the wheel, not in applying different technologies. This may even have been fostered by the directions and teachings taken by some (such as those involved with the references discussed above) which were away from the directions taken in the present invention.

II. SUMMARY OF THE INVENTION

Accordingly, the present invention provides molded structural bicycle component designs, such as frame and wheel assembly designs, in which two or more portions can be molded and joined together in a manner which is both efficient from a manufacturing perspective and structurally sound under demanding applications. The designs may involve two halves which may be complementary, mirror images, or identical and which may be shear bonded together through the use of specifically designed flanges and recesses which allow the bonding to be perpendicular to the central plane. In some embodiments, this bonding is designed so as to increase the bonding area. This can increase the structural integrity of the bond for areas of particular stress. Further, the designs may incorporate halves which may act to achieve compression between the surfaces during the joining process. These designs can thus achieve a more structurally sound bond without any need for external assembly involvement. The designs may also include integral bearings, integral molded valve stem holes, and even valve stem access areas to avoid any need for drilling or other manufacturing steps.

It is one general goal of the invention to provide for a variety of molded bicycle component designs which can be efficiently manufactured. In keeping with this goal, one object is to allow for complementary halves to be molded and assembled. It is also an object to provide designs for which structural enhancements can be incorporated at varying locations. These structural enhancements may include additional internal ribs.

Another general goal of the invention is to provide bicycle component assembly designs which can withstand the stresses incident to demanding use. It is an object to provide for designs in which the strengths of the particular resultant bond can be adjusted throughout the component assembly and the weight/strength balance adjusted to suit the functional requirements of the application. Another object is, of course, to provide for an exceptionally strong bond between two molded halves of the bicycle component assembly. This object includes the creation of a shear bond which may be optimally configured to resist the stresses incidental to demanding uses.

Yet another general goal of the invention is to provide for methods and designs which minimize the amount of labor required in the assembly process. In keeping with this goal, one object is to allow for designs in which the two halves may be joined through bonding techniques without the need for additional fasteners (such as screws, bolt, and so forth) to minimize additional assembly steps. Similarly, an object is to allow for bicycle component assembly designs, which include a hole for a valve stem or the like for a wheel and yet which do not require a separate drilling step. Yet another object in keeping with this general goal is to allow for techniques through which molded designs may be bonded together in an automated fashion. One example of this includes the object of utilizing electromagnetic bonding technology. In keeping with the general goal of minimizing assembly labor, the invention also has as an object allowing for integral components such as bearings or spacers. This may also include the incorporation of integral cosmetics and colorants and the like so that once joined, the assembly is substantially complete.

Yet another general goal of the invention is to provide for a design which can be adapted based upon the particular requirements of the many varying applications which are possible. In keeping with this goal, an object is to allow for both the increase or decrease in bonding area throughout various portions of the molded bicycle components. This allows for more efficient designs and assembly. Yet another object in keeping with this general goal is to provide for designs which can adapt and utilize polyurethane and other materials in a most efficient manner.

Naturally, further objects of the invention are disclosed throughout other areas of the specification and claims.

III. BRIEF DESCRIPTIONS OF THE DRAWINGS

FIGS. 18A–18D, 18E–18F, 18J–18N show various perimeter shapes of sections of FIG. 18, showing the flexibility and variability of the frame cross sections for specific areas.

FIG. 18R shows a top view of the steering head of the bicycle frame of FIG. 18.

FIG. 18T shows a top view of the rearward end of the bicycle frame of FIG. 18.

FIG. 18V shows an alternative embodiment of the frame having an independent rear suspension.

FIG. 20 shows a grided side view of the bicycle frame.

FIG. 21 shows a grided bottom view of the rearward end of the bicycle frame of FIG. 20.

FIG. 22 shows a grided top view of the rearward end of the bicycle frame of FIG. 20.

IV. DETAILED DESCRIPTION OF THE PREFERRED EMBODIMENTS

As mentioned earlier, the present invention includes a variety of components that may be used in different combinations, depending on the application that needs to be addressed. The invention is designed primarily to take advantage of a molded system and method for bicycle structural components of a particular and novel design and combine and modify them as needed for a variety of shapes, sizes, and orientations, as will be explained in more detail as the figures are described. This invention is intended to encompass a wide variety of uses in this specialized field. Elements, functions, and procedures that distinguish the present invention will be noted where appropriate.

As can be easily understood, the basic concepts of the present invention may be embodied in a variety of ways. It involves both methods and devices to accomplish the appropriate method. In this patent, the methods are disclosed as part of the results shown to be achieved by the various devices described and as steps that are inherent to utilization. They are simply the natural result of utilizing the devices as intended and described. In addition, while some devices are disclosed, it would be understood that these not only accomplish certain methods, but also can be varied in many ways. Importantly, as to the foregoing, all these facets should be understood to be encompassed by this disclosure.

Figure 1A:
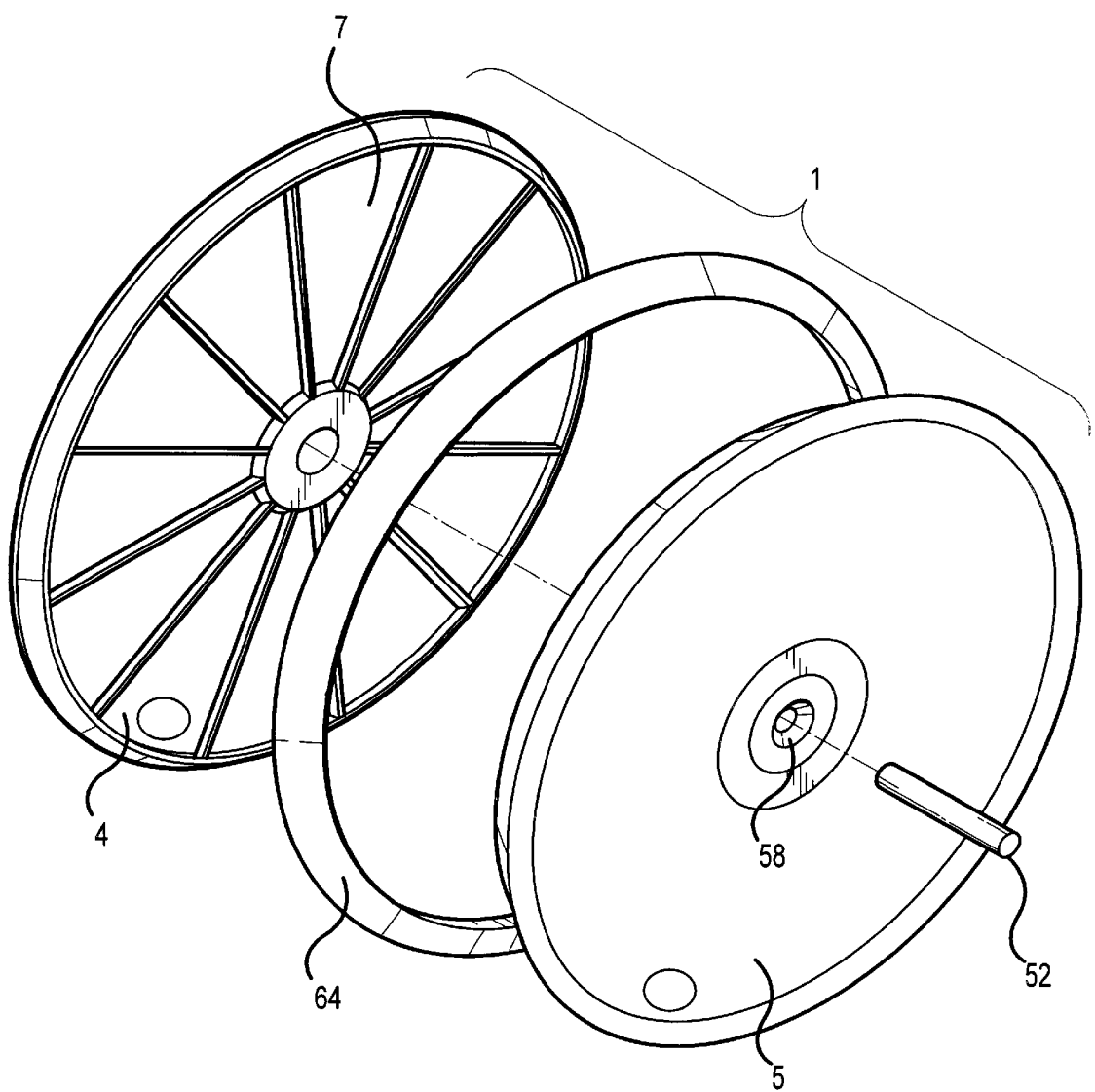
FIG. 1A is an exploded view of one embodiment of a structural bicycle component such as a wheel assembly according to the present invention.
Figure 1B:
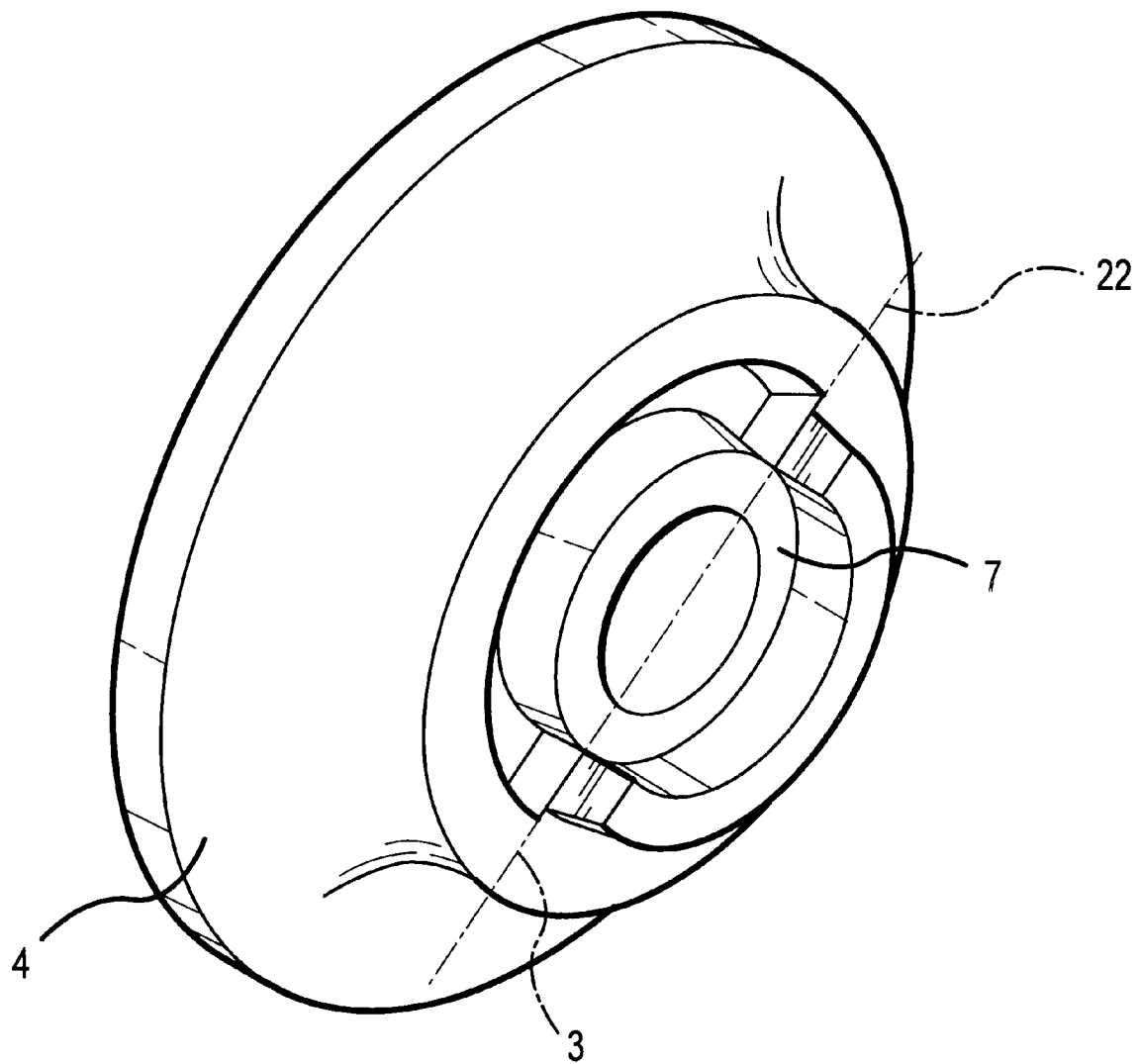
FIG. 1B is an expanded view of the inner hub portion shown in FIG. 1A.

As can be seen from the drawings, the basic concepts of the invention may be adapted in many ways. Referring to FIGS. 1A and 1B, it can be seen that in basic form the invention may involve two identical molded halves which have their interiors (7) configured so as to allow easy assembly. Such a wheel assembly may be molded of a variety of numbers of pieces. When made of two halves, assembly may be completed by simply joining the two halves, shown arbitrarily as first molded portion (4) and second molded portion (5), inserting an axle (52) and placing a tire (and tube) such as conventional tire (64) on the wheel assembly (1). Naturally, the tire and/or tube may be placed either before or after joining the two halves. As shown in cross section in FIG. 2, the entire wheel will exist radially centered around axle (52) and also about a central plane (3).

In keeping with one of the goals of the invention, such a simple assembly is very efficient as all it involves is creating at least the first molded portion (4) and a second molded portion (5) and then simply joining them together for later completion. While the design shown in FIG. 2 consists of only a first and second molded portion (4) and (5), as mentioned earlier it should be understood that any number of molded or other parts may be involved. By selecting only two molded parts, that is first molded portion (4) and second molded portion (5), it is believed that a hollow design such as that shown in FIG. 2 can be easily and efficiently manufactured and assembled.

Figure 2:
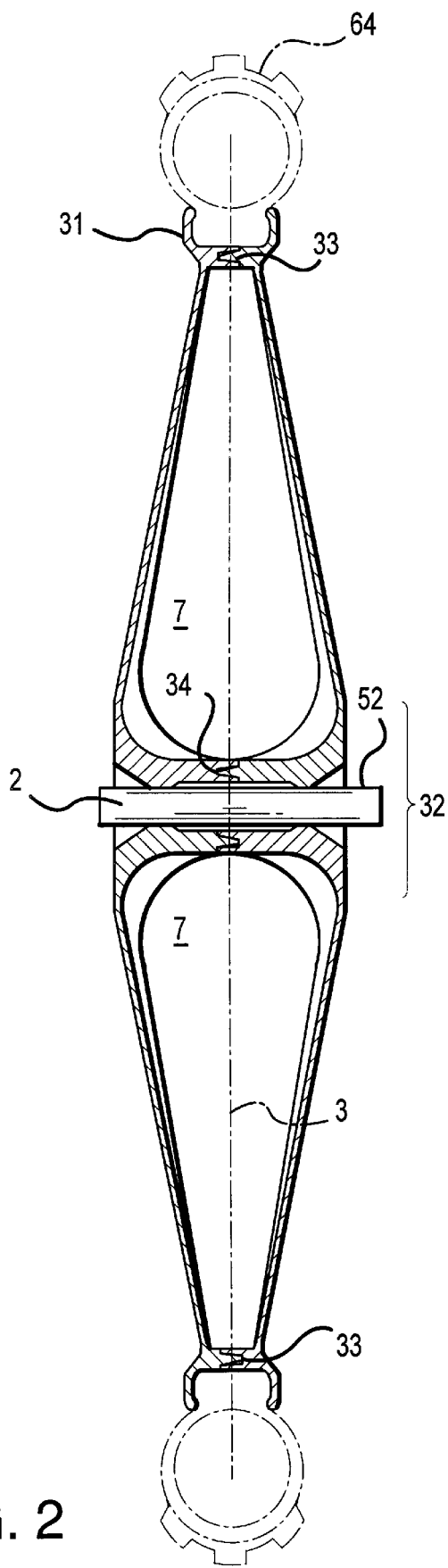
FIG. 2 is a cross sectional view of an assembled wheel similar to that shown in FIG. 1A.

An important component of the invention is how the various molded parts are joined together. While, naturally, certain aspects of the invention may encompass any type of fastening technique, some embodiments are particularly designed to be only bonded together in some fashion. By using the term "bonding" in its most generic sense, the invention encompasses a host of different technologies which essentially join two parts together and hold them together in a manner which does not require a great amount of labor. Also, the use of term "structural bicycle component" is meant to include components for tricycles, unicycles, and so forth and includes any of the structural components such as frames, wheels, spokes, and so forth. As can be understood easily from FIG. 2, this may involve bonding together first molded portion (4) and second molded portion (5) so that some type of fastening occurs over most of a bond area. As shown in FIG. 2 this bond area may consist of rim bond (33) radially aligned around central axis (2). It may also include hub bond (34). Such bonds may hold together the various portions of the wheel assembly in a manner which, when joined, creates a wheel assembly which is substantially symmetrical about a central plane (3). (Multi-speed rear wheels may be offset from the central plane to allow for the sprocket.) By being substantially symmetrical, the wheel design may be basically a mirror image of itself on either side of central plane (3). This can assist in maintaining the proper balance and stress distributions throughout the wheel.

As mentioned earlier, one of the advantages of such a molded wheel design is that the wheel can be easily and inexpensively manufactured when compared to traditional metal spoke designs. This is an important aspect to commercial success for several reasons. First, the capital equipment required to roll form a flat strip of steel in order to create the rim in traditional wheel designs is fairly expensive and extensive. This is compounded by the fact that welding equipment is necessary to butt weld the joint and form the rim in a continuous circle. Further, grinding equipment is also usually necessary to remove excess weld material, not to mention, the hole punching equipment or drilling equipment to create holes for the spokes. Once created, the traditional assembly process of inserting the spokes and properly lacing and tensioning each spoke to assure true lateral and radial runout characteristics are exceedingly expensive. Such highly skilled labor requirements can even account for up to one-third of the total labor cost of a traditional entire bicycle assembly. Obviously, this is a significant cost impact for traditional bicycle designs. As mentioned earlier, although this aspect has been well known for years, the challenge of manufacturing and assembling an appropriate multi-piece molded bicycle component assembly has to some degree been how to appropriately bond the molded parts and yet create sufficient structural integrity for demanding uses. This is accomplished through a unique shear bonding aspect in the present invention.

As shown in FIG. 2, it can be seen that both first molded portion (4) and second molded portion (5) are designed to fit together and to thus allow bonding in a manner so that the bond is subjected to primarily shear forces. This departs from most of the prior designs and is an aspect which contributes to the significant structural achievements of the invention.

Figure 3:
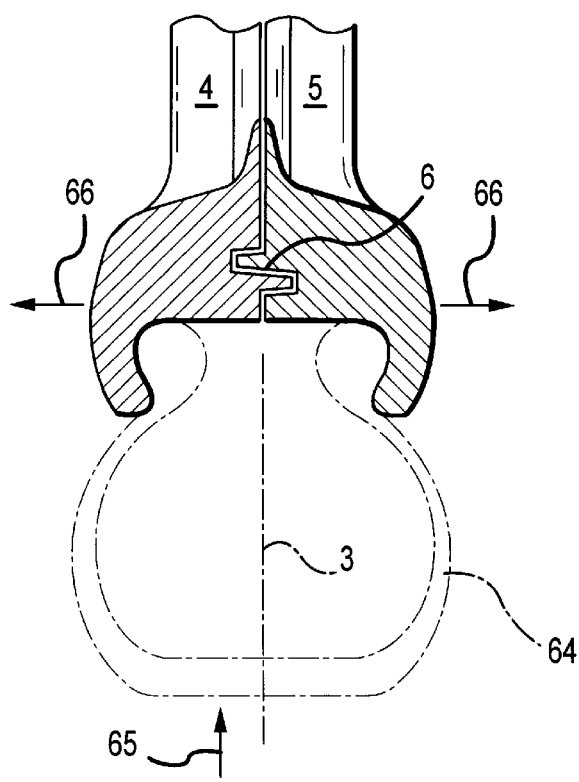
FIG. 3 is a cross sectional view of a rim portion of two parts of a spoked wheel design after being joined together.

When in use, wheel assembly (1), shown in FIG. 2, is subjected to a host of forces as may be appreciated from FIG. 3. This naturally includes the force due to the weight of the vehicle (and often its rider) shown in FIG. 3 as normal force (65) and resisted by forces (65a) and (65b). This force is also partially transformed into a tension force (66) through pneumatic internal pressure of the tire for a wheel design. Significantly for bonded designs, tension force (66) acts to pull first molded portion (4) and second molded portion (5) apart. These forces are further increased in situations in which wheel assembly (1) is subjected to high speed turns, bumps in the road, and the like. In spite of the fact that this force aspect should be well understood by those having ordinary skill in the art, and in spite of the fact that those skilled in bonding parts together should have well understood that the bond is stronger in shear rather than tension, the prior art designs, if bonded, seemed to focus almost exclusively upon bonds which were subjected to tension loading. Significantly different from these approaches, the present invention takes the approach of creating bonds which are primarily shear loaded.

While in hindsight the aspect of creating a shear loaded bond seems potentially unremarkable, prior to the present invention, those having ordinary skill in this particular art appeared not to have fully appreciated this aspect. As mentioned earlier, they may have also been led away from aspect and may have even misunderstood how to create such a bond. This may have been understandable because, prior to the present invention, the technique of bonding along an interior shear surface may have appeared extremely difficult or even impossible to achieve in a practical and efficient manner. As shown in FIG. 3, the present invention achieves a shear bond (6) along a surface which is substantially perpendicular to the central plane (3). Further, it may be noticed that this shear bond (6) is achieved in the interior of the wheel (or other bonded component).

Figure 4:
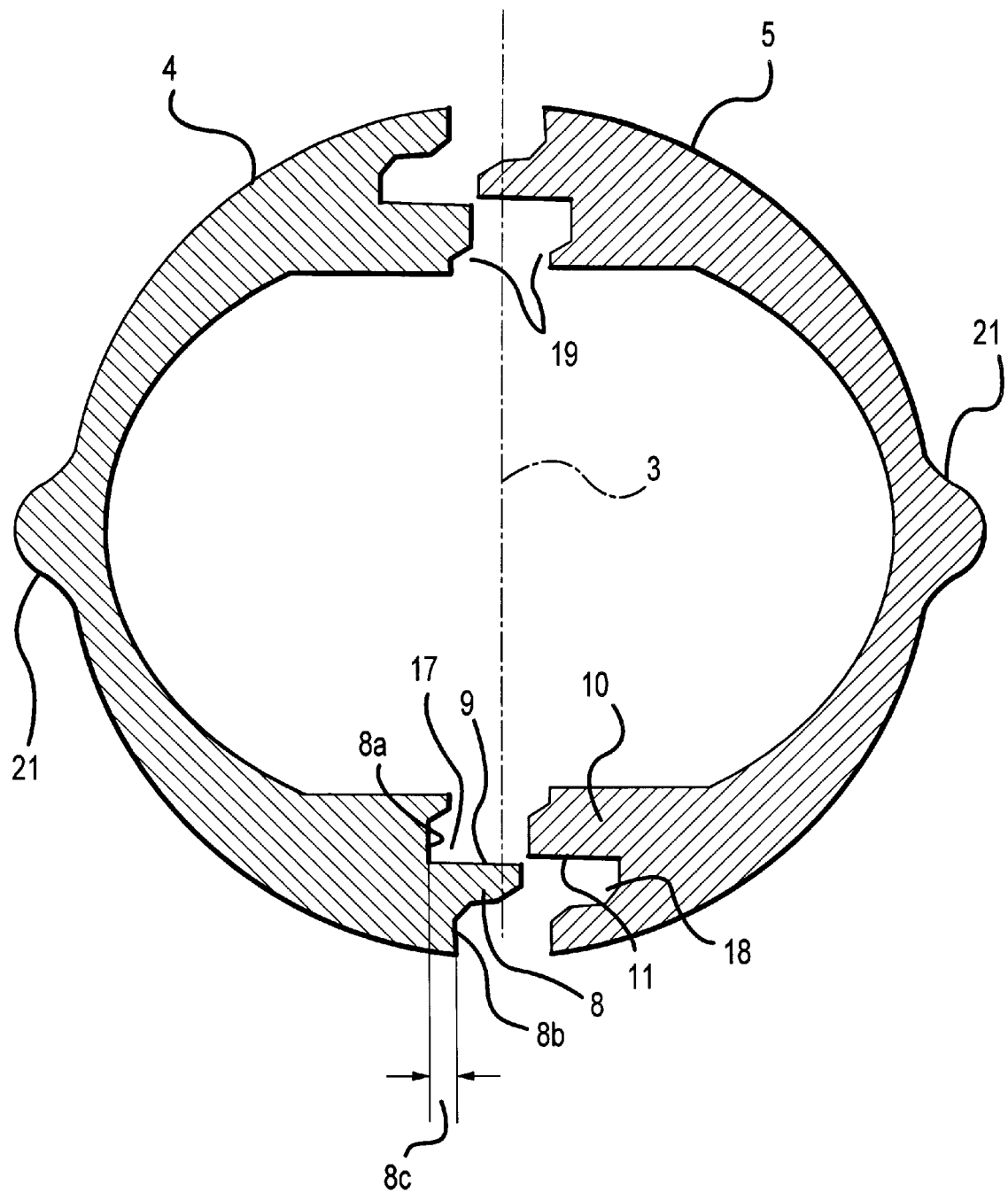
FIG. 4 is a cross sectional view of a shear bond portion of a component just prior to assembly and showing recess faces that flank both sides of a flange and which are offset from each other.

Referring to FIG. 4, a cross sectional view of another bond area (which could be a spoke bond, although naturally the various bonding designs may be implemented at any location on any of the structural bicycle components), it can be easily understood how an interior and perpendicular shear bond is achieved. As shown in this particular design, first molded portion (4) may include first flange (8) which has first bonding surface (9) situated thereupon. Similarly, second molded portion (5) may include second flange (10) having second bonding surface (11) on it. These surfaces and parts are designed to mate with each other in a fashion, so that a shear bond is situated between first and second bonding surfaces (9) and (10). As can be seen, first bonding surface (9) and second bonding surface (11) are arranged so as to be substantially perpendicular to the central plane (3). Further, it should be understood that more than one surface may be included. As shown in FIG. 4, this might include the opposite surfaces of first flange (8) (also considered a middle flange) and second flange (10) (also considered an upper flange) as may be readily appreciated. Notice the recess face (8a) (also considered an upper flanking offset recess face) of recess (17) and the recess face (8b) of middle recess (18) (also considered a lower flanking offset recess face), below and adjacent to flange (8), depicted above the lower flange on the second molded portion (5) (throughout the designations "upper", "middle", and "lower" only being used to distinguish the elements and not to require relative positions, of course). The recess faces flank both sides of the flange (8), recede backward from the outward extension of flange (8), and are offset from each other (that is, at unequal distances from the central plane) by a distance (8c).

Unlike some of the teachings of earlier designs, the current design may be configured so that the shear bond between first bonding surface (9) and second bonding surface (11) extends across the central plane (3). This has the advantage of supplying cross sectional strength in an area which is particularly subject to stress. The flanged shear bond allows both of the molded portions (4) and (5) to work in unison in opposing the normal force (65) of FIG. 3 without breaking the bond with typical loads. If the bond was aligned along the central plane such as in Fujitaka, the bond itself would be subject to the forces of (65), (65a), and (65b), attempting to separate the molded portions. While naturally the shear bond may be located anywhere, the design shown locates the bond so that it extends across the central plane (3) and is nearly symmetrical with respect to central plane (3). This is accomplished by providing a first recess (17) and a second recess (18) into which first and second flanges (8) and (10) fit.

An advantage of a molded design which is bonded together is the fact that reinforcements can be provided in an optimal manner where required. These reinforcements may consist of internal stiffeners or ribs (21) as shown in FIGS. 15A–E. Other alternatives include internal or external ribs (21,) as shown in FIG. 4. Importantly, the design affords sufficient adjustability to allow for structural enhancement as desired. If the ribs are located on the interior, they may even be hidden from view. The design allows variation to achieve style, strength distribution, and weight savings as may be required for particular structural applications as well. It also allows such ribs to be located as far from the central plane (3) as possible which can increase the structural characteristics as mentioned earlier.

A particular advantage to the design as shown in FIG. 2 is that both first molded portion (4) and second molded portion (5) may be identical. This allows capital savings in that a single mold may be utilized to create both portions of the component, particularly the wheel. In addition to the economic advantages of such a design, it also addresses some of the challenges often encountered in molding such as uniform shrinkage, uniform material, uniform color, and the like. Importantly, when creating two molded portions to fit together it is important that the interior surfaces of the component be designed to fit together at several locations. As shown in FIG. 4, to achieve this the complementary surfaces of each molded portion may be designed to be complementary so that they may be joined to create one component assembly. The aspect of being complementary encompasses not only the identical designs discussed earlier, but it also includes mirror image designs, and designs which merely fit together such as might be achieved in a male/ female snap together arrangement. Naturally, it should be understood that first and second molded portions (4) and (5) need not be identical as this is merely a convenience which might be appropriate for specific designs.

Figure 5:
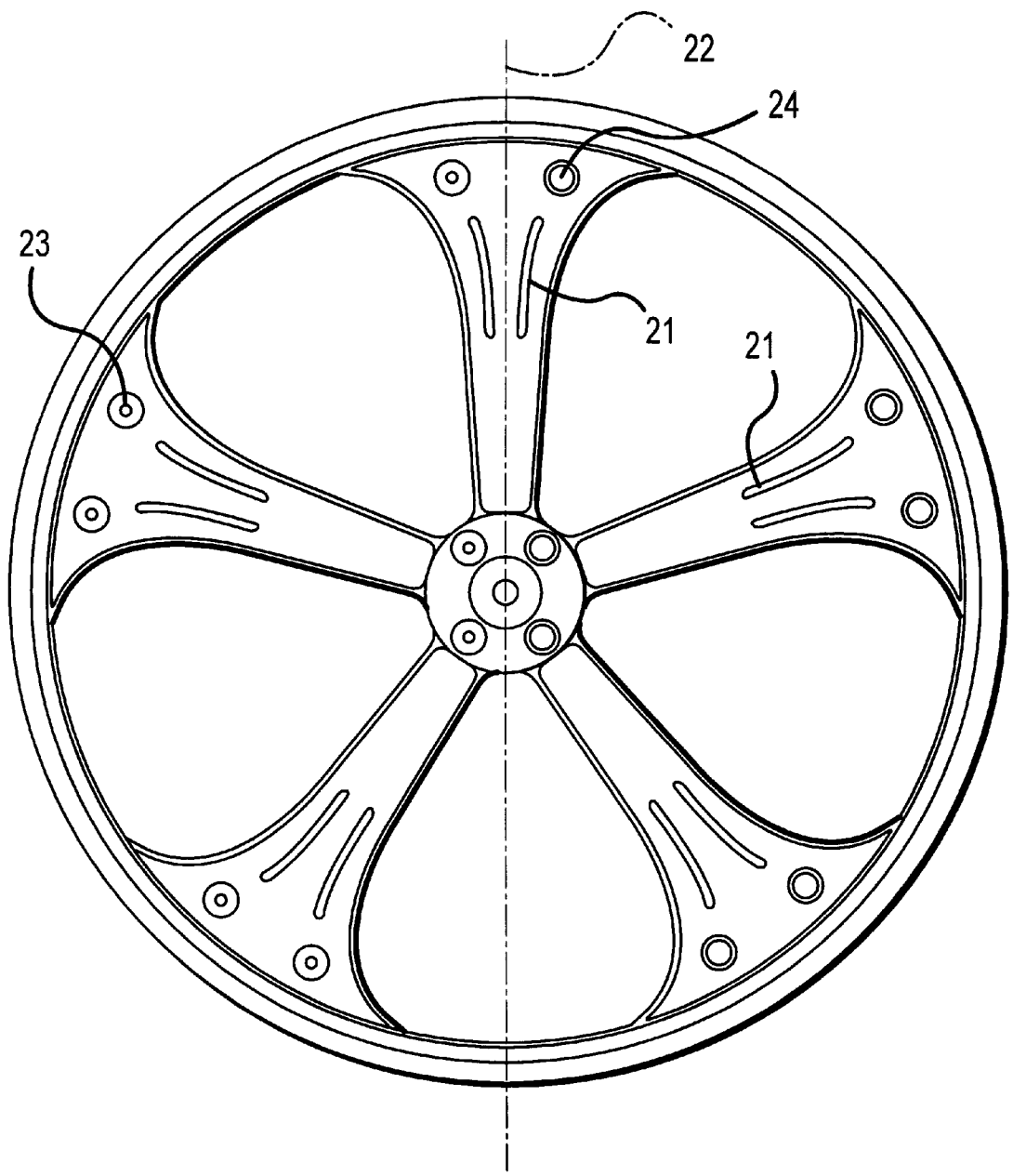
FIG. 5 is an inside view of one half of a spoke design.

In designing parts which are efficient to manufacture, it can also be advantageous that the complementary surfaces of such parts be configured in a manner which allows identical parts (or at least identical inner surfaces) to fit together. This aspect of the invention is referred herein as a "symmetrically opposite" design. Such designs can be best understood with reference to FIGS. 5 and 15A which show the inner surfaces of two such parts. First, it should be understood that complementary surfaces are defined as those portions of the inside of a molded part which are designed to fit together and join with another molded part. Thus, the design or shape of areas which do not fit together is not considered relevant with respect to the term "complementary surface." While all inside surfaces might be truly identical they need not be to understand the concept of symmetrically opposite designs. For some specific designs, this complementary surface may be only the portion which extends across the central plane (3). To further understand this aspect, it is also advantageous to define two halves of one molded part by dividing the wheel along some arbitrary axis. This axis, the folding line (22) shown in FIGS. 5 and 15A–D, defines two halves in which complementary surfaces are symmetrically opposite images. The concept of symmetrically opposite images may include merely complementary surfaces as shown in FIG. 5. For example, as shown in FIG. 5, while at one location on the part a male part (such as a barb (23)) exists, at a location opposite the folding line (22), a corresponding female part (such as a receptor (24)) exists. Thus, as can be seen in FIG. 5, the portion to the left of folding line (22) includes male and female portions which are reversed—that is, a male portion becomes a female portion and vice a versa—on the portion to the right of folding line (22). Such a design is complementary across the folding line (22).

Truly symmetrically opposite designs may also exist, for instance, for the design shown in FIGS. 15A–E, while at one location on the part a flange exists, at a location opposite the folding line (22), a corresponding recess exists. Thus, as can be seen in FIGS. 15A–D, the portion to the left of folding line (22) includes flanges and recesses which are reversed— that is a flange becomes a recess and vice a versa—on the portion to the right of folding line (22). In this way, the complementary surfaces are truly "symmetrically opposite" images. They will also fit together in a complementary fashion when a second, identical piece is molded. Further, the parts may be merely complementary. Thus, while flanges and recesses are shown (the symmetrically opposite designs), male and female portions (the broader designation appropriate for both flanges and recesses which also encompasses other types of complementary designs) may also be possible.

This can be further understood with reference to a design such as that shown in U.S. Pat. No. 4,344,655 which shows barbs, the male portion and corresponding receptors, the female portion, although as previously discussed such a technique for joining the halves might work in low-stress applications such as the children's design as shown in that patent, singular fastening devices such as the barbs have an undesirable incident of concentrating stresses when the wheel is in use. In the present invention, by designing the first male flanged portion to fit within a first female receptor portion in a fashion in which the designs are symmetrically opposite, a wheel assembly can be achieved through a single molded part. Naturally, these features may be integral to the molded wheel assembly or other bicycle components and may be situated to fit within each other at locations where the stresses seem to be concentrated the most for the particular application.

Figure 6:
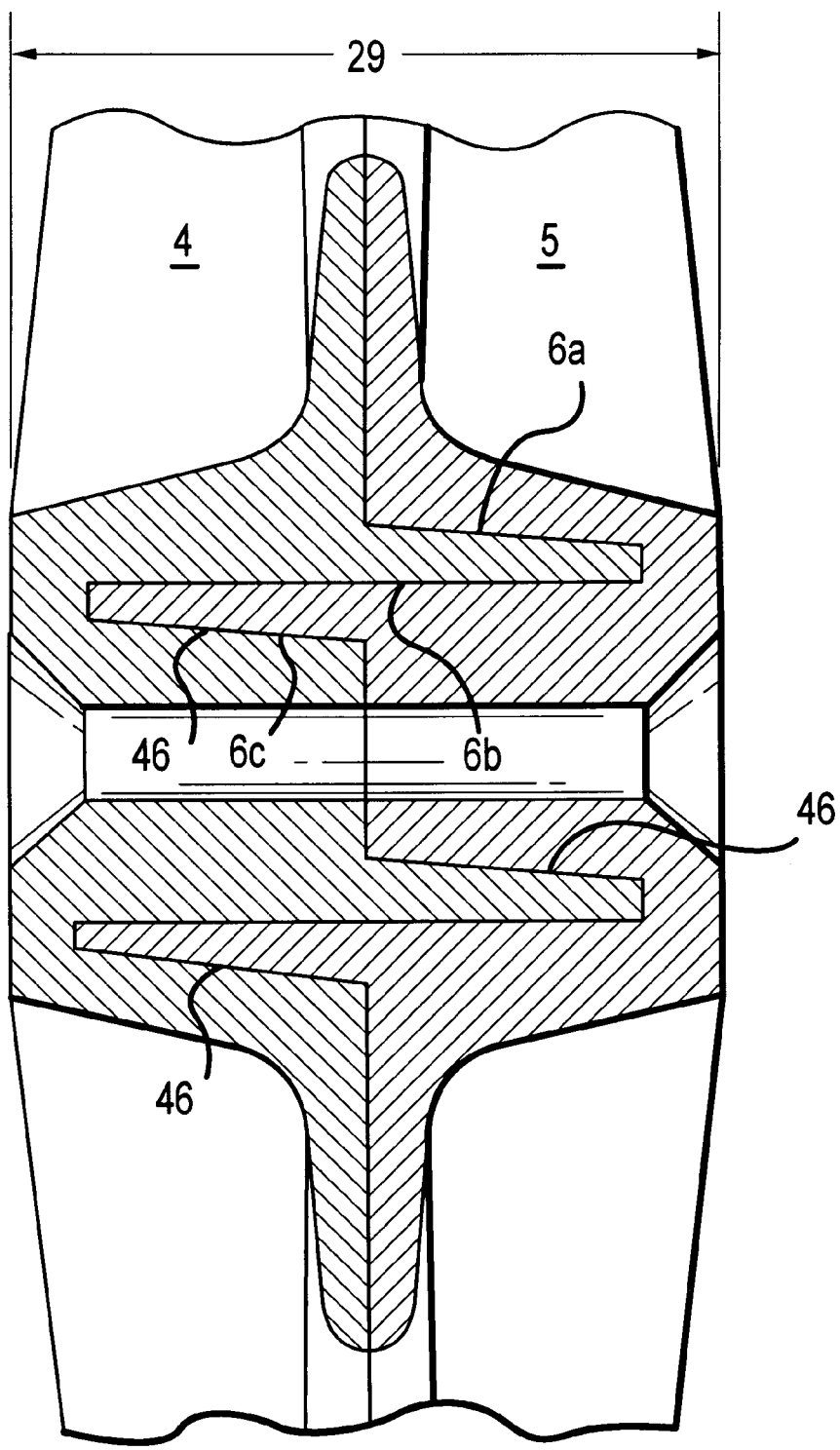
FIG. 6 is a cross sectional view of a different hub portion design after assembly.

Referring to FIG. 6, another type of bonding design, it can be understood how the entire width of shear bond (6) can actually exceed the total width (29) of the wheel in the vicinity of the shear bond. As can be easily understood, through the designs shown in FIGS. 6 and 7, the shear bond may exist at location (6a), (6b), and (6c) or along surfaces (13) and (15). When added together, each of these areas present a width which may effectively exceed the width (29) of the wheel in the vicinity of the shear bond (6). This is shown with symmetrically opposite images but need not be so limited as can be readily appreciated.

Figure 7:
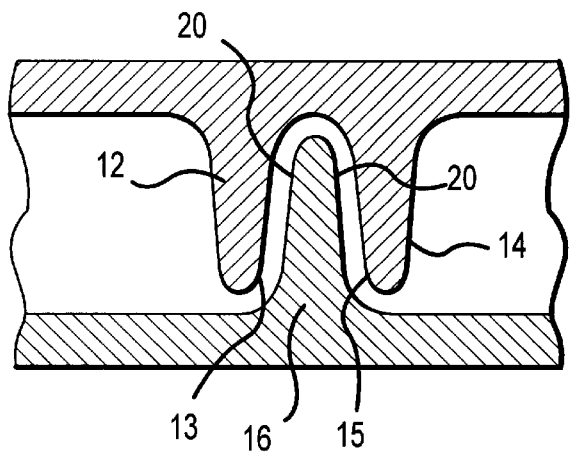
FIG. 7 is a cross sectional view of yet another design showing a bonded area.

In addition to the techniques shown in FIG. 6, it is also possible to extend the width of shear bond—and thus the strength of the shear bond—through alternative designs. One such alternative design is shown in FIG. 7. Naturally, it should be understood that all bonding techniques can be used at any location. As shown, the design may incorporate left flange (12) which includes left bonding surface (13). Integral to the same part might also exist right flange (14) with corresponding right bonding surface (15). These bonding surfaces might face each other and define a recess into which center flange (16) might be inserted. They may also be positioned apart for adhesive bonding and the like or literally touching each other for solvent bonding and the like. As shown, the center bonding surfaces (20) of center flange (16) are positioned to join with both left bonding surface (13) and right bonding surface (15). In this fashion, enhanced structural strength and bonding area can be achieved. Such variations in design (as well as the other variations shown) allow for an adjustable bond design.

In addition to the particular type of bonds, the bonds can be located at any desirable portion for further variability. As shown in FIG. 2, rim bond (33) located in rim portion (31) can be used with or without hub bond (34) located in hub portion (32). In addition, spoke bonds can be included along a plurality of spoke portions as well. These bonds may extend radially from axis (52). As discussed below, these shear bonds can be used throughout a molded bicycle frame and other components as well.

Figure 8A:
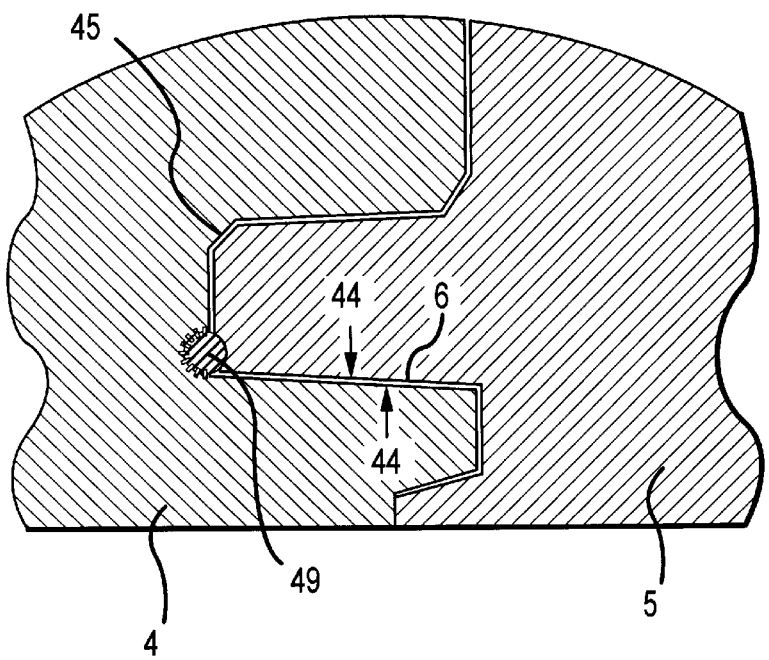
FIG. 8A is a cross sectional view of a bonding area design which incorporates an integral seal.
Figure 8B:
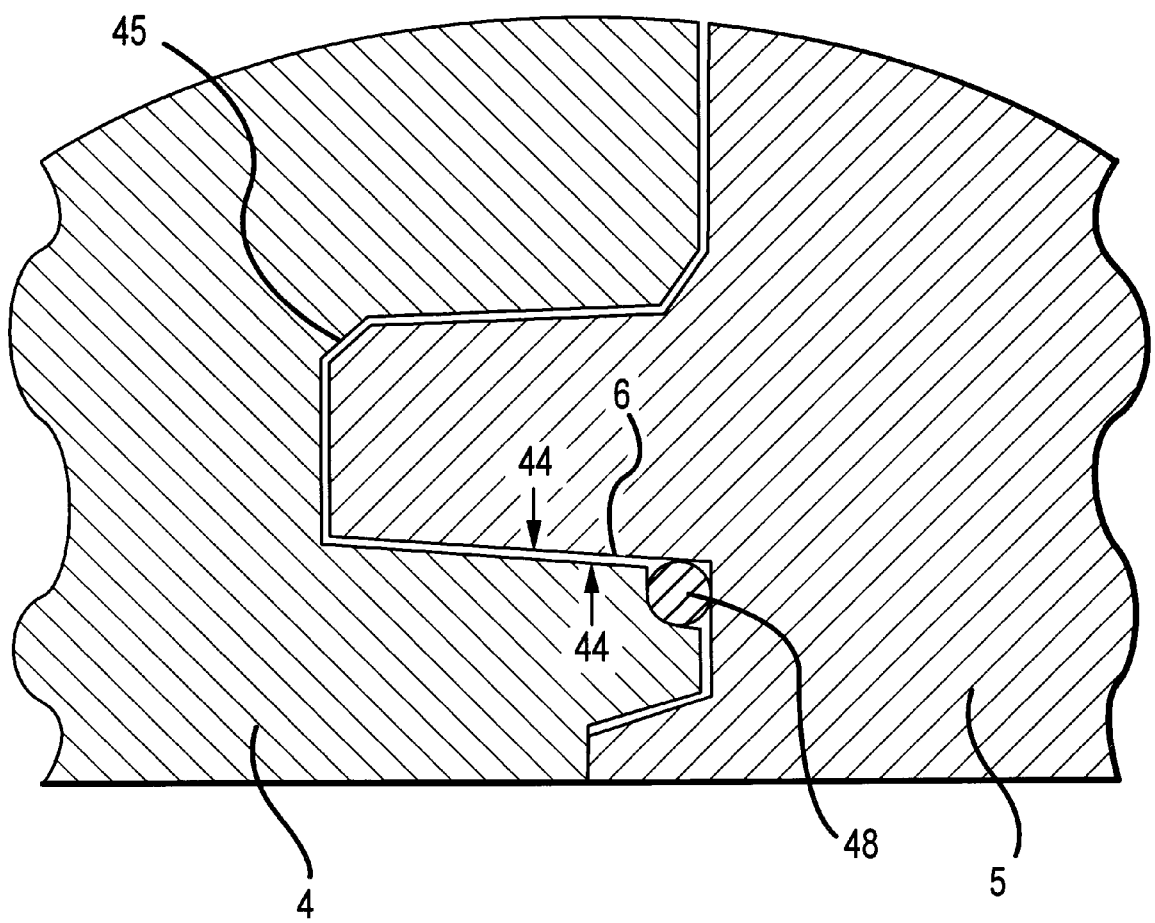
FIG. 8B is a cross sectional view of a bonding area design which incorporates a separate seal.

Another aspect which allows the enhanced bonding strength for the designs shown is the fact that some compression element can be used to allow the surfaces to be pressed together perpendicular to the bond areas. As shown in FIGS. 8A and 8B, this compression element can include an angled surface (45) (separate or integral), a taper (46) as shown in FIG. 6, or some other type of design. This is remarkable because at first glance it would seem difficult or even impossible to create compression forces which are parallel to central plane (3). These compression forces (44) can act so as to merge two bonding surfaces together perpendicular to the force applied in assembling first molded portion (4) and second molded portion (5). Thus, while first and second molded portions are forced together in a direction parallel to the central axis (2) (and perpendicular to the central plane (3)), the design results in a transformation of the assembly force to a force perpendicular to the bonding surface—compressive force (44). As shown, it should also be understood that angled surface (45) can be oriented so as to urge the bonding surfaces toward each other after substantial insertion has occurred so as to avoid displacing any bonding solvent, cement, or other such material.

Yet another aspect shown in FIGS. 8A and 8B is the fact that a seal such as rim bond seal (48) may be included in order to allow first molded portion (4) and second molded portion (5) to be joined in a substantially airtight fashion. This can be important if tubeless tires are used. As shown in FIG. 8B this may include a separate seal which is substantially air impervious such as rim bond seal (48). This may be simply an O-ring or some other more specific design. The seal may also be an integral seal as shown in FIG. 8A. This integral seal (49) may be molded into one part as shown in FIG. 8A. Any type of seal may also exist at only the bottom of the recess if desired. As will be discussed in FIGS. 16 and 17, an airtight seal in the molded wheel may not be necessary even when using a tubeless tire, such as when used with a rim case.

Figure 9:
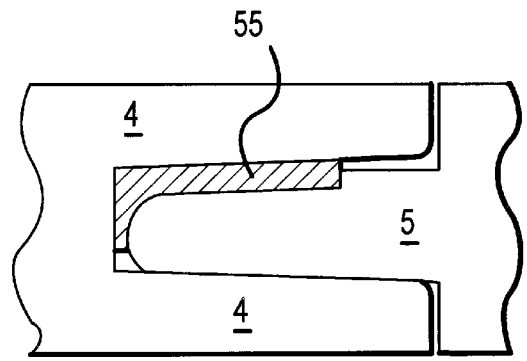
FIG. 9 is a cross sectional view of a bonding area design which is adapted to the utilization of an electromagnetically active material for bonding purposes.

As mentioned earlier, a variety of bonding techniques can be utilized. This may include electromagnetic welding, solvent bonding, cement bonding, adhesive bonding, frictional bonding, ultrasonic radiation bonding, and other types of techniques as well. With respect to the use of electromagnetically active material for electromagnetic welding, it may be understood with reference to FIG. 9 where electromagnetically active material (55) may be included within the bond area. After initial assembly the entire assembly may be subjected to electromagnetic radiation which activates the material and thus causes localized heating at the location of shear bond (6). This may afford the additional advantage of allowing substantially complete assembly to occur and allowing the compressive force (44) to exist during the activation of the electromagnetically active material if various aspects of the invention are combined. It may also act to seal the parts against air leakage.

Figure 10:
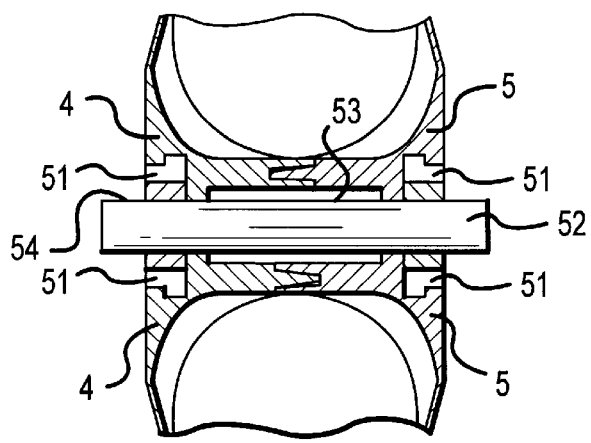
FIG. 10 is a cross sectional view of a design (such as a hub portion) which incorporates an integral bearing.

As shown in FIGS. 10, 11, 11A, and 11B, additional manufacturing and assembly efficiency may also be achieved by creating a design which includes an integral bearing (51), integral race (47), a pressed-in bearing, or even integral bearing material. Such bearing arrangements include a great variety of designs including, integral material molded into the part, integral material molded into the axle, or even the proper selection of materials for the part and/or axle so as to exhibit low friction. As shown in FIG. 10, the integral bearing (51) may be situated so as to have an axial relationship with respect to hub portion (32) and axle (52) about the axle's outer surface area (53) so as to be exposed to axle along an axle interface (54). In some designs, a bearing component such as integral race (47) may be inserted prior to molding both first molded portion (4) and second molded portion (5) to make that component integral to the design. The remaining components (such as the ball bearings) can be added later. When the bearing is actually a separate material that is molded within first and second molded portions (4) and (5), it may also be appropriate to have this bearing exposed to a significant amount of the axle interface, the word "significant" being defined as an amount which allows sufficiently free rotation of axle (52) within the wheel.

Figure 11:
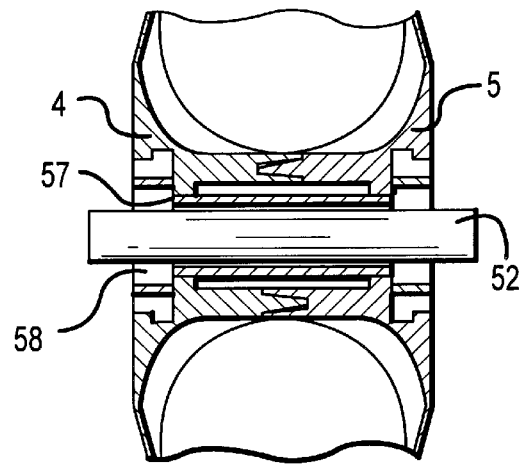
FIG. 11 is a cross sectional view of a design which incorporates an integral bearing and a separate spacer.
Figure 11A:
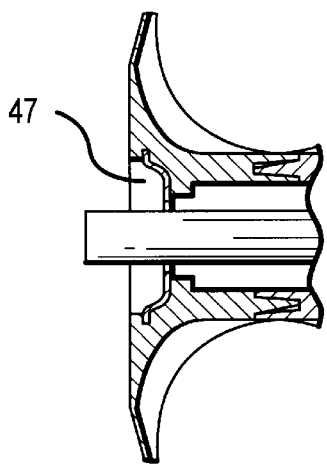
FIG. 11A is a cross sectional view of one side of a design which incorporates an integral bearing race.
Figure 11B:
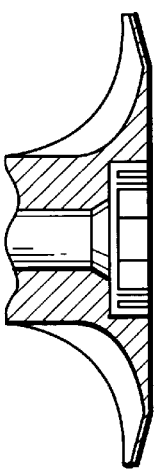
FIG. 11B is a cross sectional view of one side of a design which incorporates a pressed-in bearing.

Since it may be desirable to make the wheel as hollow as possible for weight savings, it may be desirable to include a spacer in the vicinity of hub portion (32). This is shown in FIG. 11 where spacer (57) may be incorporated in the vicinity of axle (52) or axle hole (58). This spacer may create a pre-established width which is maintained regardless of the amount of tension caused through tightening of the nuts on axle (52). It may be positioned so as to maintain the spacing and bear the load in the vicinity of the axle hole (58) and thus may be positioned directly between the left and right end of axle hole (58). Since spacer (57) may experience higher forces than other parts, it may be made of a more expensive, stronger material. Naturally, it may also be integral to the design as shown in FIG. 10.

Figure 12:
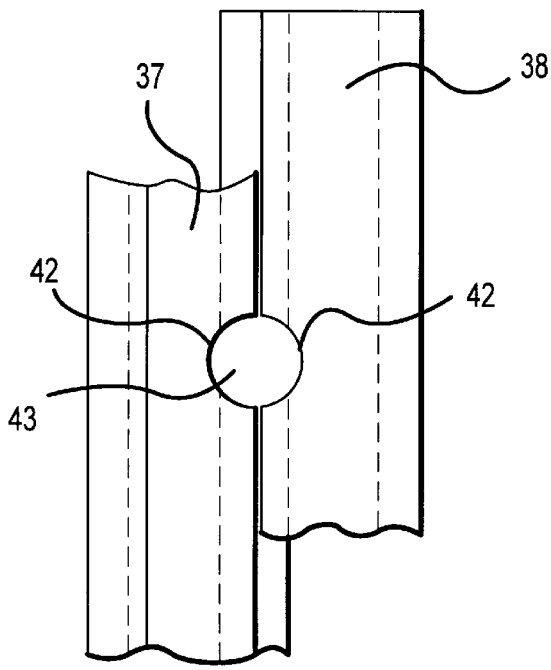
FIG. 12 is a top view of part of the rim portion of an assembled wheel which incorporates a molded hole feature.

As another manufacturing advantage, a valve stem or other hole can be molded into the design in the center of the rim. FIG. 12 shows how first rim portion (37) and second rim portion (38) may each have a semicircular boundary (42) about each of their inner rim surfaces. These semicircular boundaries may be located along the rim portion at a location (such as along folding line (22) shown in FIGS. 5 and 15A–C) so as to form a single hole (43) when the two parts are assembled. By choosing locations which correspond after the parts have been aligned for assembly, it may be easily understood how this type of molded design allows assembly of a hole (43) without any need for drilling or the like. As those having ordinary skill in the art would understand, the actual shape of the hole or opening may be varied. Thus, the term "semicircular" is herein defined to encompass any shape, be it square, oval, or otherwise.

Figure 13:
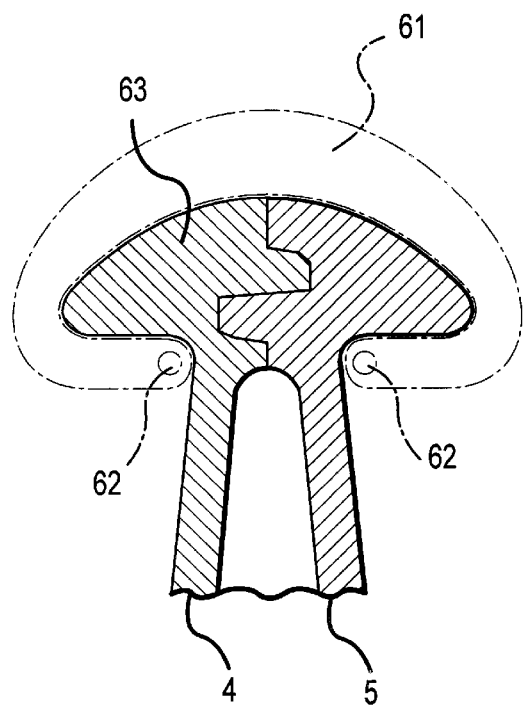
FIG. 13 is a cross sectional view of an assembled rim portion of a design which is adapted to a foam, or other solid material, tire application.
Figure 14:
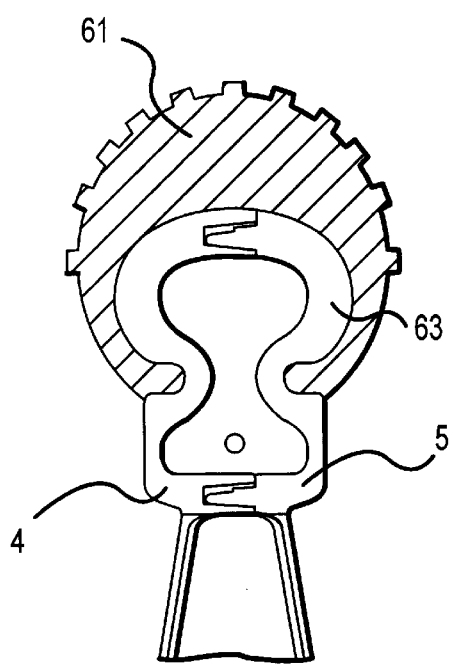
FIG. 14 is a cross sectional view of an assembled rim portion of another design which is adapted to a foam tire application.
Figure 15A:
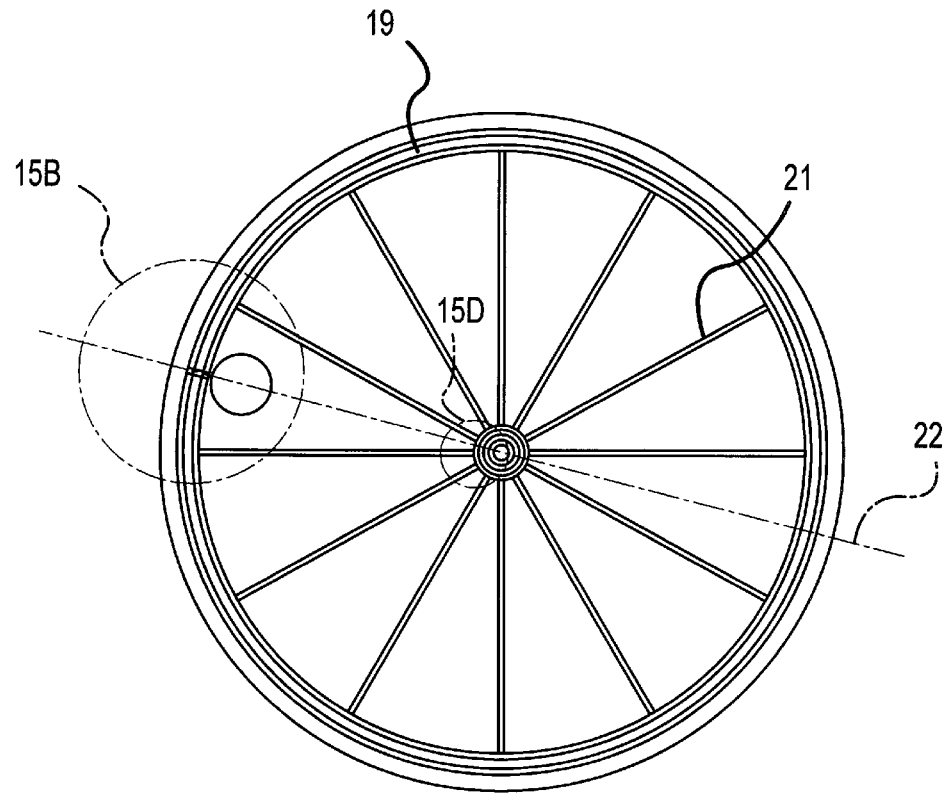
FIG. 15A is an inside view of a reinforced disc design.
Figure 15B:
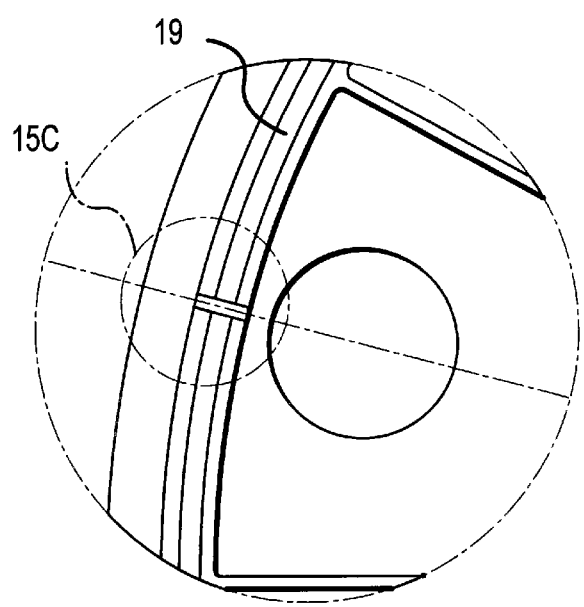
FIG. 15B is an expanded view of the valve stem area of the reinforced disc design shown in FIG. 15A.
Figure 15C:
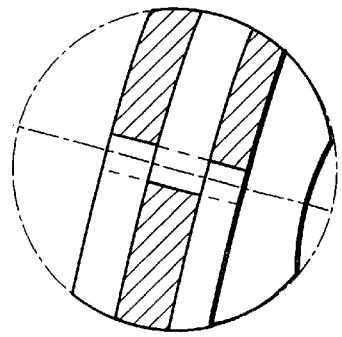
FIG. 15C is a further expanded detail of the valve stem area of the reinforced disc design shown in FIG. 15B showing the symmetrically opposite aspect about a folding line through the center of the valve stem hole.
Figure 15D:
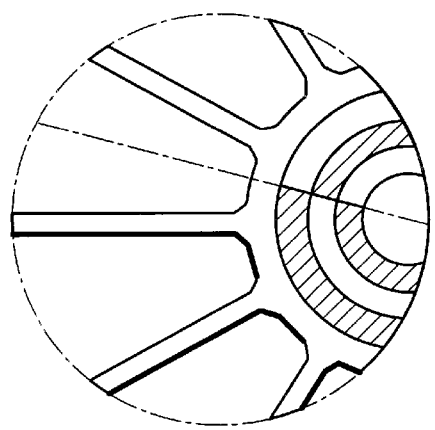
FIG. 15D is an expanded detail of the hub portion of the reinforced disc design shown in FIG. 15A showing the symmetrically opposite aspect about a folding line through the center of the hub portion.
Figure 15E:
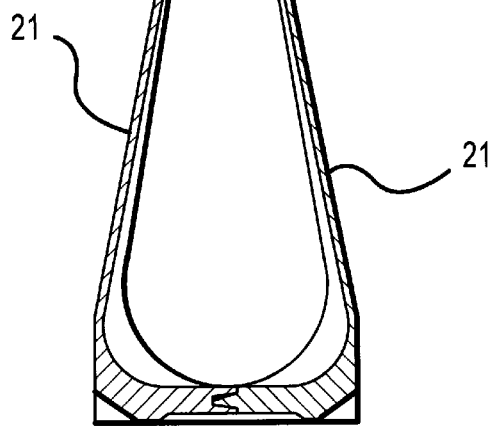
FIG. 15E is a cross sectional view of an assembled reinforced disc design as shown in FIG. 15A showing the internal rib feature.

Yet another aspect which might be achieved through the present design is the ability to be configured to accommodate foam or other solid molded material tires. As shown in FIGS. 13 and 14, it can be understood how foam tire (61) might be accommodated through a design which might include an internal support (63). This can be very advantageous as at present the materials such as polyurethane and the like which are used for foam tires are fairly expensive. Through the proposed designs, such expense can be minimized by using inexpensive molded material. In addition, not only can more appropriate support be created for such tires, the tires may even be shaped in a more desirable fashion than that typically used for conventional wheel tire designs. Naturally, some type of fastener (62) can also be incorporated to hold foam tire (61) on the wheel assembly as well. The design of internal support (63) may also be arranged so as to allow, desired shock absorption characteristics by varying the shape orientation and/or thickness of internal support (63) along its length.

It should also be understood that other designs may also incorporate integral cosmetics and the like which may be molded into the bicycle component to further enhance manufacturing and assembly efficiency as well as to enhance the durability of the visual aspect of the product.

Figure 16:
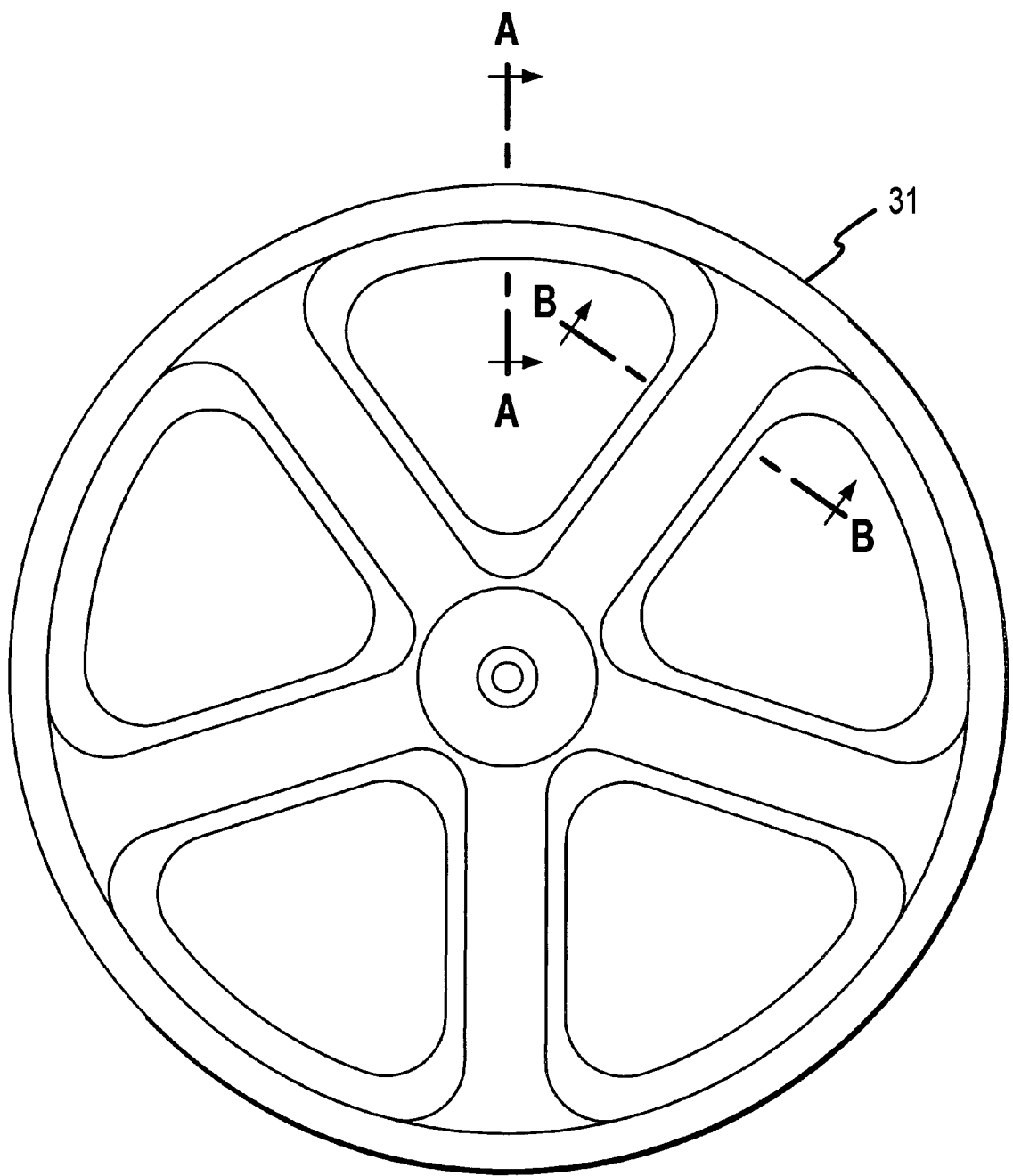
FIG. 16 shows an alternative embodiment having an extended rim portion.
Figure 17:
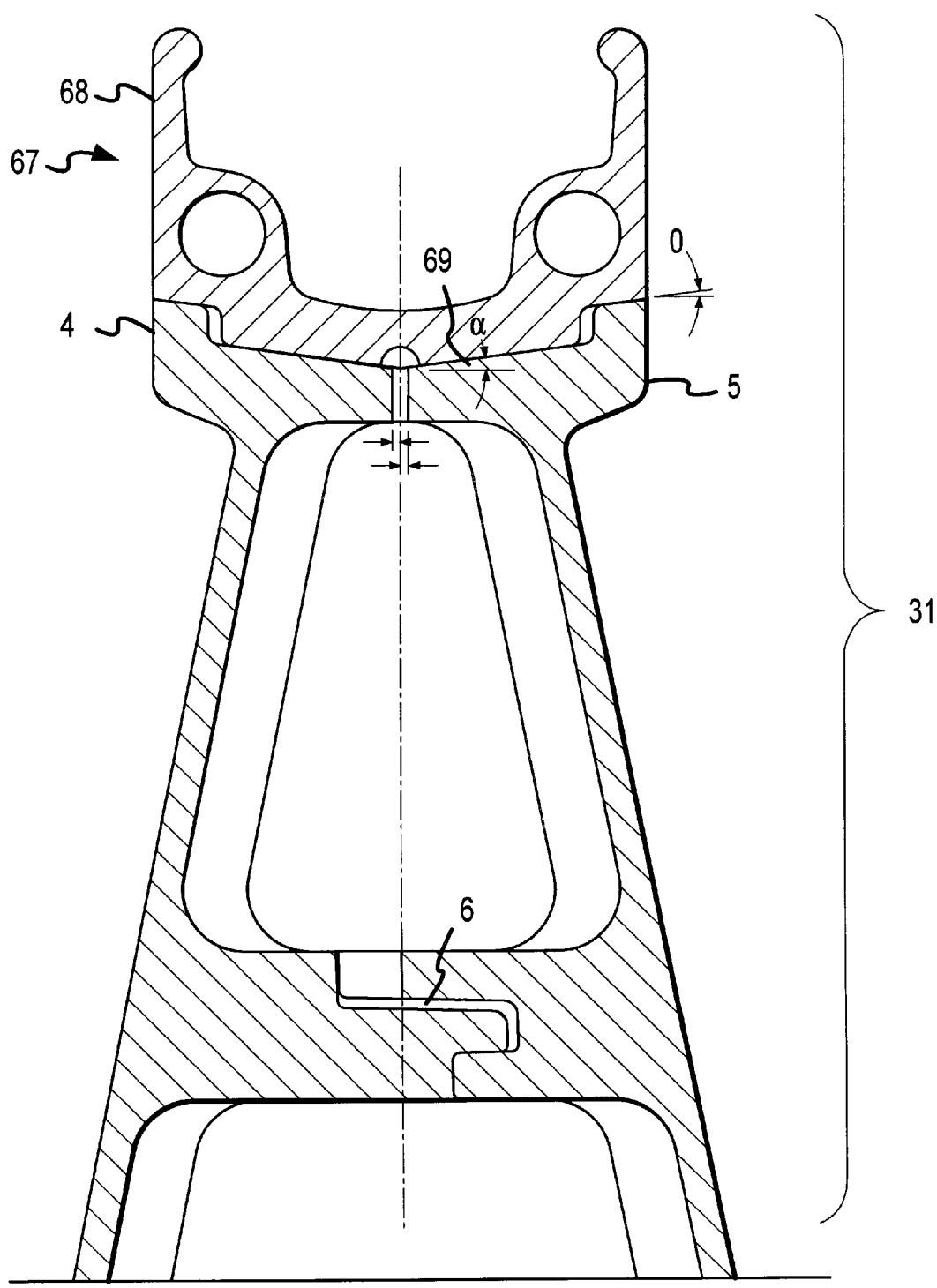
FIG. 17 shows a cross section A—A of FIG. 16, where the shear bond is somewhat radially inward from the depiction of FIG. 2 and still in the rim portion and includes a rim case.

FIGS. 16 and 17 show an extended rim portion (31), similar to FIG. 14, demonstrating the flexibility of this design. The rim portion may be extended as shown in cross section A—A in FIG. 16 to allow further improvements to the basic shear bond joint component. As shown in FIG. 17, the shear bond is moved slightly lower (in the preferred embodiment and without limitation approximately one inch) than the configuration such as is shown in FIG. 2. The first molded portion (4) may be attached to the second molded portion (5) with the shear bond (6). In this embodiment, a rim case (67) may be inserted between the two molded portions prior to attaching them together. The rim case (67) may be made of some durable material, including aluminum, that may surround the periphery of the wheel. The molded portions (4) and (5) typically would true up the rim case during assembly due to the angle $\alpha$ (typically 2–12 degrees) and the forces perpendicular to the central plane. The rim case may also be formed with a braking surface (68), against which some external brake system could be applied, as would be known to those with skill in the art. The interface (69) may be formed on an angle $\alpha$, so that restrained contact between the rim case and the outer rim surfaces of the first and second molded portions may be made.

Figure 18:
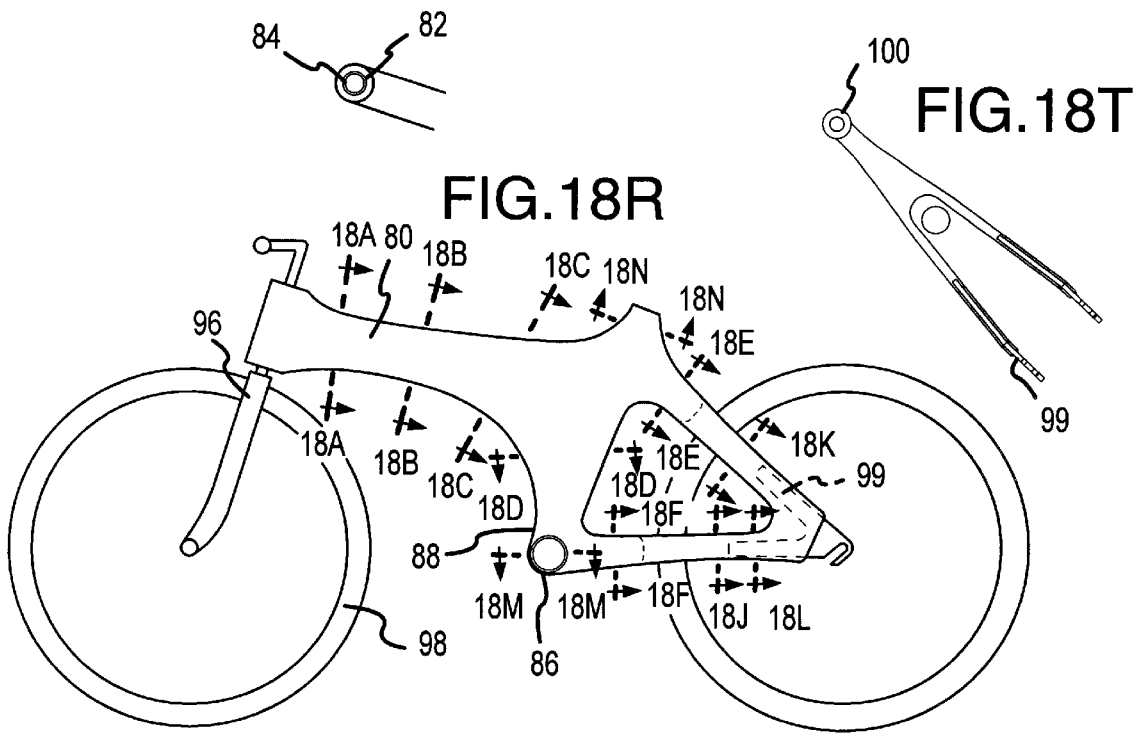
FIG. 18 shows a side view of a molded bicycle frame.
Figure 18S:
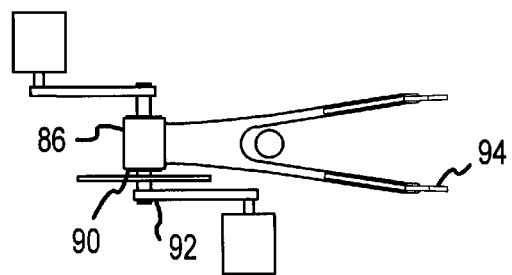
FIG. 18S shows a bottom view of the rearward end of the bicycle frame of FIG. 18.

In FIG. 18, a side view of the molded bicycle body is shown. For reference, the identified parts are: a molded frame (80), a steering head (82), a steering head reinforcing tube (84) which may resist the various forces exerted on the steering head as discussed below, a steering fork (96), a wheel (98), a bottom bracket (86), a bottom bracket tube (88), a rear stay (99), an axle (90), a crank arm (92), a toe plate (94), a seat mast receiver (100) which may receive a seat mast (not shown).

Regarding the frame aspect, it is helpful to understand the variety of the forces which come into play during its use. There are elements which hold the wheel(s) in place, may be attached in the rear through a pair of toe plates (94); the steering head (82), which may have a reinforcing tube (which may be of metal), in the front through which is attached the steering fork (96) holding the front wheel (98); the bottom bracket through which are inserted the axle (90) for the chain sprocket and crank arms; and the seat mast receiver (100) into which may also be placed a seat mast receiver reinforcing tube which then receives the seat mast which is affixed the cycle seat (not shown). Each of these functions are independent and yet are important for the complete performance of the cycle. Not only are the elements distinct and separated physically on the frame, but the forces and the nature of the forces are quite different, thus making demands upon the frame for a wide variety of resisting capabilities.

In the aspect of the frame relative to providing structural strength, it is apparent in the drawings (see FIG. 18 and related various cross sections) that the cross section of the frame varies such that the section of the frame is selected in order to best deal with the loads imposed in that particular area. For example, in the area of the frame near the steering head where the loads are composed of both torsional loads and bending loads primarily in the vertical plane, the cross section may be a near circle with the slightly larger major axis in the vertical plane (FIG. 18A). In the area between the seat mast receiver and bottom bracket where the loads are primarily bending in the lateral direction and crank arm clearance is an issue, the frame may be thinner side-to-side and the major axis may be in the fore-and-aft direction FIG. 18D).

Near the beginning of the rear stays (99), the frame joint may be completed just ahead of the path of the rear tire. The rear stays may remain open, approximated as a "C" shape as viewed from the rear, or the "C" shape may be closed by bonding, welding or some other manner affixing another component to complete the contiguous closing of the rear stays as shown in FIG. 18.

In the invention as described herein, it may be valuable to make an internal contiguous network of webbing reinforcements. This is accomplished through the method of molding and the design of the reinforcing web structures. With the present invention, the webbing reinforcements may be individualized. The various angles of each webbing reinforcement, its thickness, proximity and spacing from other webs, and web depth can all be varied in order to accommodate the loads and stresses that result under actual usage conditions in each of the particular sections as desired. Not only is it possible to accommodate the loads and stresses, but because of the ability to vary the nature of these webs, significant weight savings are accomplished over other methods where the wall thickness must be similar in thickness throughout to accommodate the nature of the molding process. Internally pressurized bladder type molding is typically unable to provide any manner of internal reinforcement. Injection molding is generally limited to all of the wall thickness being of similar thickness in order to accomplish adequate flow and mold filling to produce a part. Lost wax methods of molding may provide some manner of internal reinforcements, but are limited to wall thicknesses which are sufficiently large to allow adequate flow of material and mold filling.

In the aspect of the frame regarding the steering head (82), which provides a receiving part for the steering head reinforcing tube (84) and steering fork (96), several functional characteristics are necessary. First, the steering head should resist the forces which are basically vertical in nature created by the weight of the rider pushing down upon the steering head and fork. Second, the bicycle steering head generally possesses an angle, in order to remain stable during use, such that a line drawn down through the steering head to its intersection with the ground should lie ahead of the point of contact of the tire with the ground (known as the "trail"). Such an alignment helps create a torque or moment which attempts to cause the wheel and its fork to rotate such to cause the bicycle to return to an upright condition and creates both torsional and bending forces at the steering head. Equally, when the front brake is applied, torsional forces in the opposite direction may be reflected back up through the fork, through the steering head reinforcing tube and into the steering head in order to provide braking forces for the tire against the ground. These torsional and bending forces generally should be resisted by the steering head portion of the frame.

Third, due to the alternating side-to-side application of pedal forces at the crankshaft held at the bottom bracket (86), torsional forces may be reflected from the bottom bracket up through the frame (80) and then down through the steering head, steering head reinforcing tube, steering fork and through the wheel and tire to the ground. Thus, the functional force characteristics that may be provided by the steering head are a straight vertical force, a resistance to torsion in both directions in the side view, and a resistance to torsion in both directions as viewed from the rear.

Figure 19A:
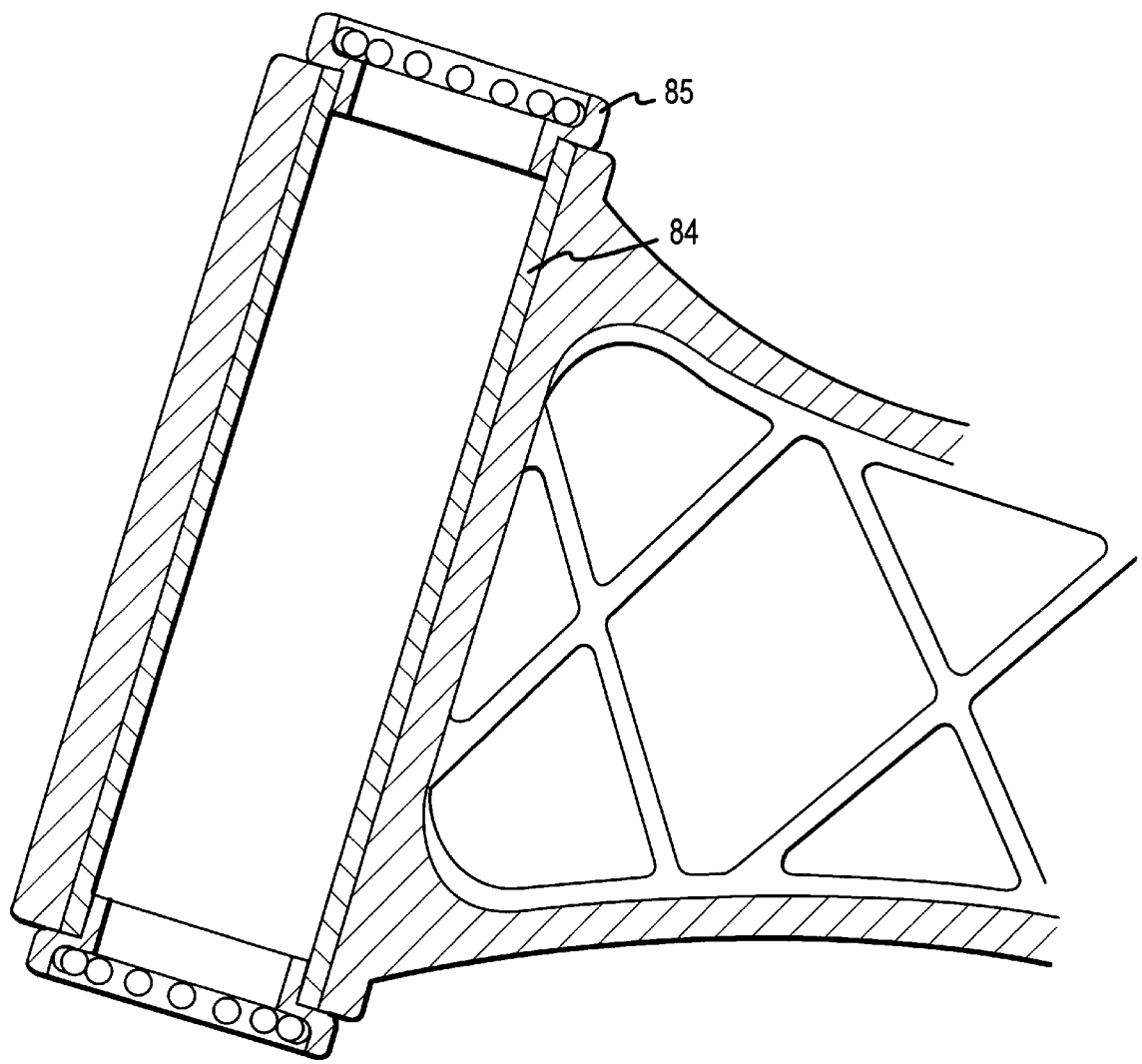
FIG. 19A shows a cross section of the steering head in one embodiment with a steering head reinforcing tube and two bearing races.
Figure 19B:
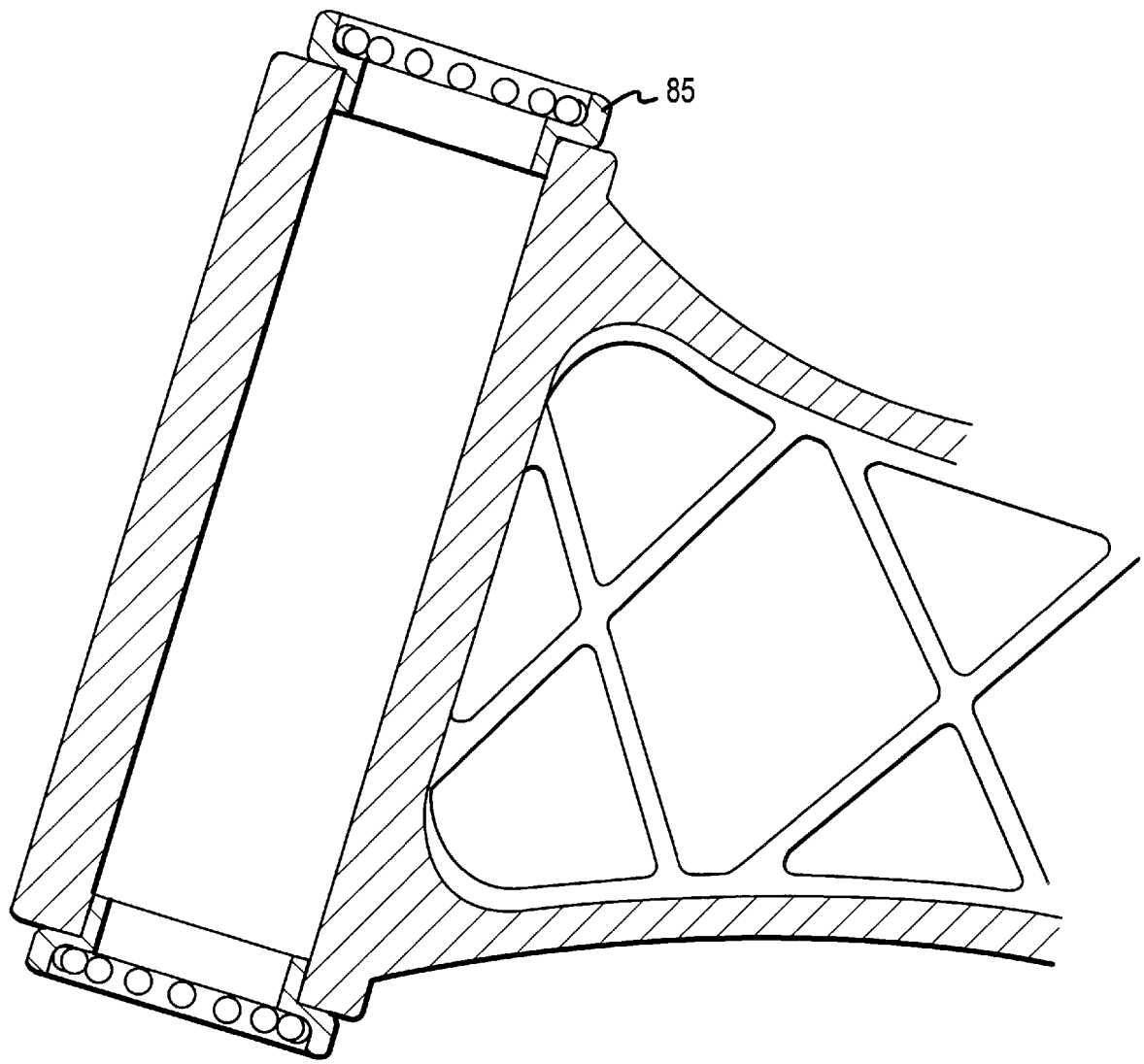
FIG. 19B shows an alternative embodiment of FIG. 19A without the steering head reinforcing tube.
Figure 19C:
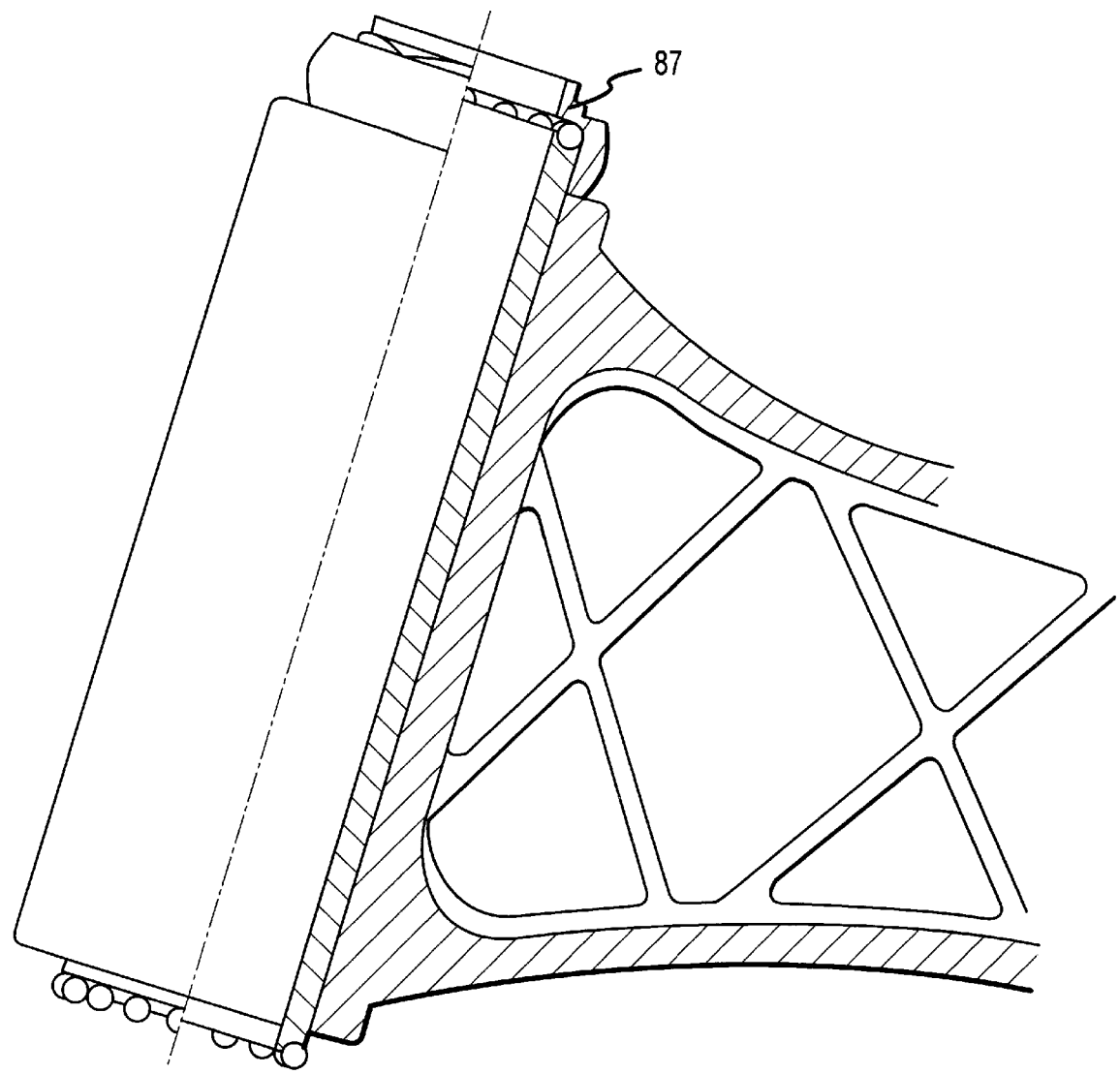
FIG. 19C shows another embodiment of FIG. 19A where a cartridge is used.
Figure 19D:
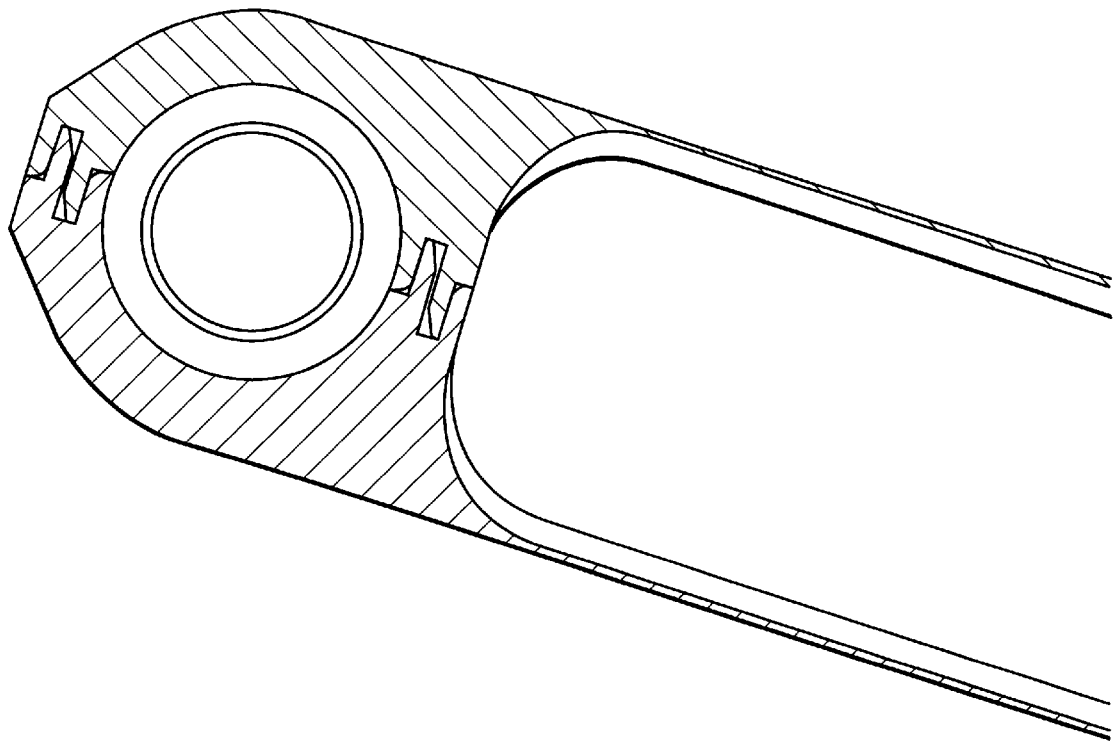
FIG. 19D shows a top view cross section having a shear bond area.

The aspects of the invented frame may respond to each of these forces. First, the frame may be constructed such that a steering head reinforcing tube (84) (typically metal, although high strength/temperature plastics may also be appropriate) or bearing races (85) are inserted at each top and bottom apertures into the steering head. (See FIGS. 19A–D). The reinforcing tube or bearing races help spread the various forces over the steering head and steering head joint area. As an example, the tube may be integrated into the joint by raising the temperature of the thermoplastic material in an area 0.060" deep (or some appropriate depth) radially outward from the hole to a temperature near the melting temperature of the base material, for example, 400 degrees F. for polypropylene thermoplastic, in a very short period of time, for example 3 seconds, to prevent the heat from transferring deep into the thermoplastic. As the shallow depth of thermoplastic reaches a temperature near its melting point, the heating device, such as a collapsing, internally expanding, electrically heated mandrel is collapsed to clear the thermoplastic material (for example, 0.010" less than the hole), withdrawn and as it is withdrawn the attached mandrel shaft and second internally expanding mandrel, holding the head reinforcing tube, pulls the head reinforcing tube into position. Since the heating mandrel and the head reinforcing tube insertion mandrel are on a common accurately centered mandrel shaft, the head reinforcing tube is generally accurately positioned and held in true position while the thermoplastic material cools below its melting temperature and becomes solid, firmly and accurately holding the reinforcing tube in position. The hole in the thermoplastic material may be made purposely smaller than the head reinforcing tube by an amount calculated to insure that a small amount of the thermoplastic material is shaved off around the perimeter of the hole as the head reinforcing tube is inserted, for example, 0.010". The thermoplastic material cools to a solid, the insertion mandrel holding the tube is contracted, releasing the head reinforcing tube, and the head reinforcing tube/ frame is now removed from the free end of the fixture containing the common mandrel shaft. In another embodiment shown in FIG. 19C, the head reinforcing tube, bearings and seals may be in the form of a cartridge (87), ready for insertion of the steering shaft and fork when the cartridge is completely inserted.

Figure 19E:
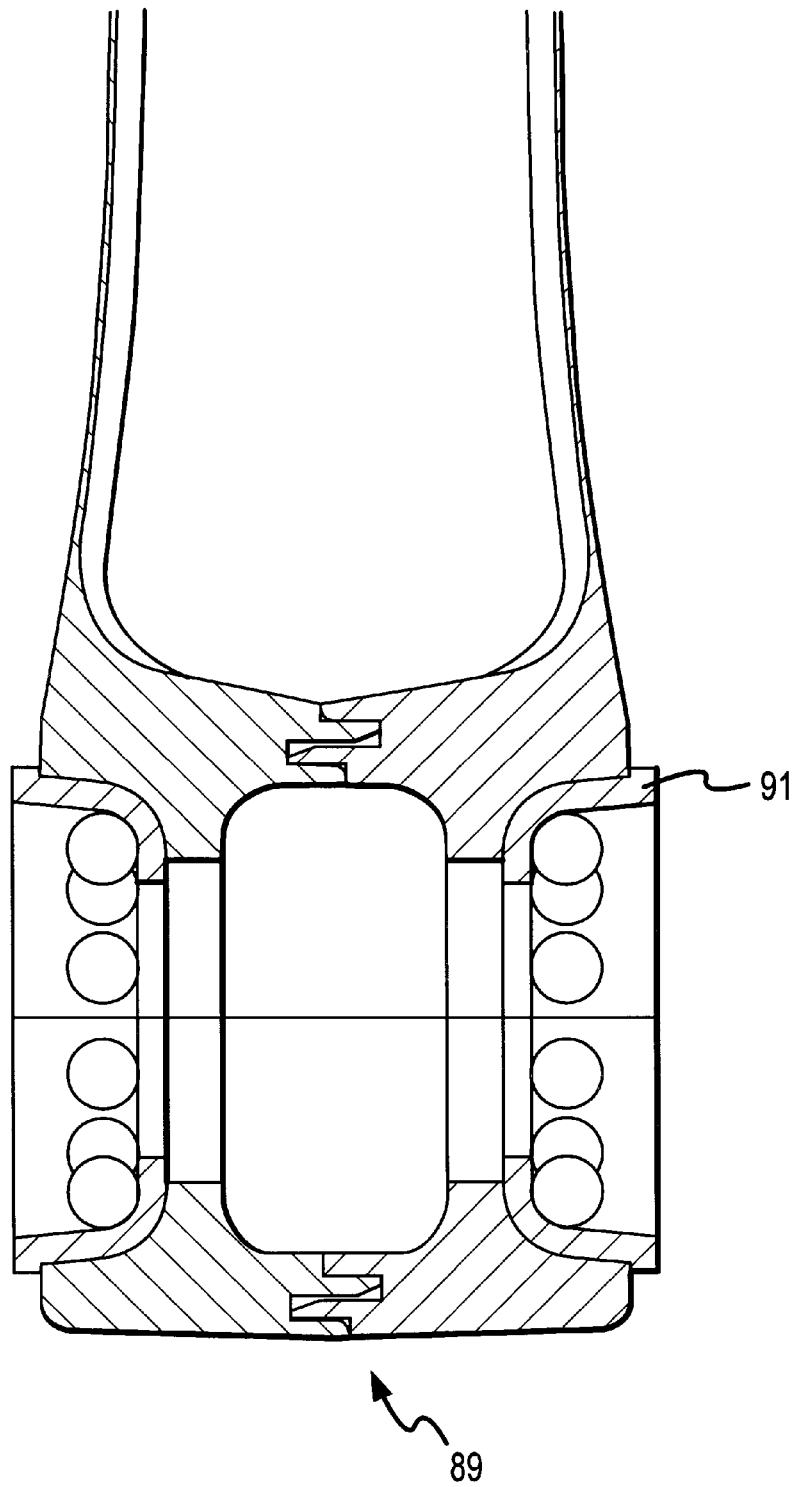
FIG. 19E shows a cross section of the bottom bracket area having bearing retainer caps in one embodiment.
Figure 19F:
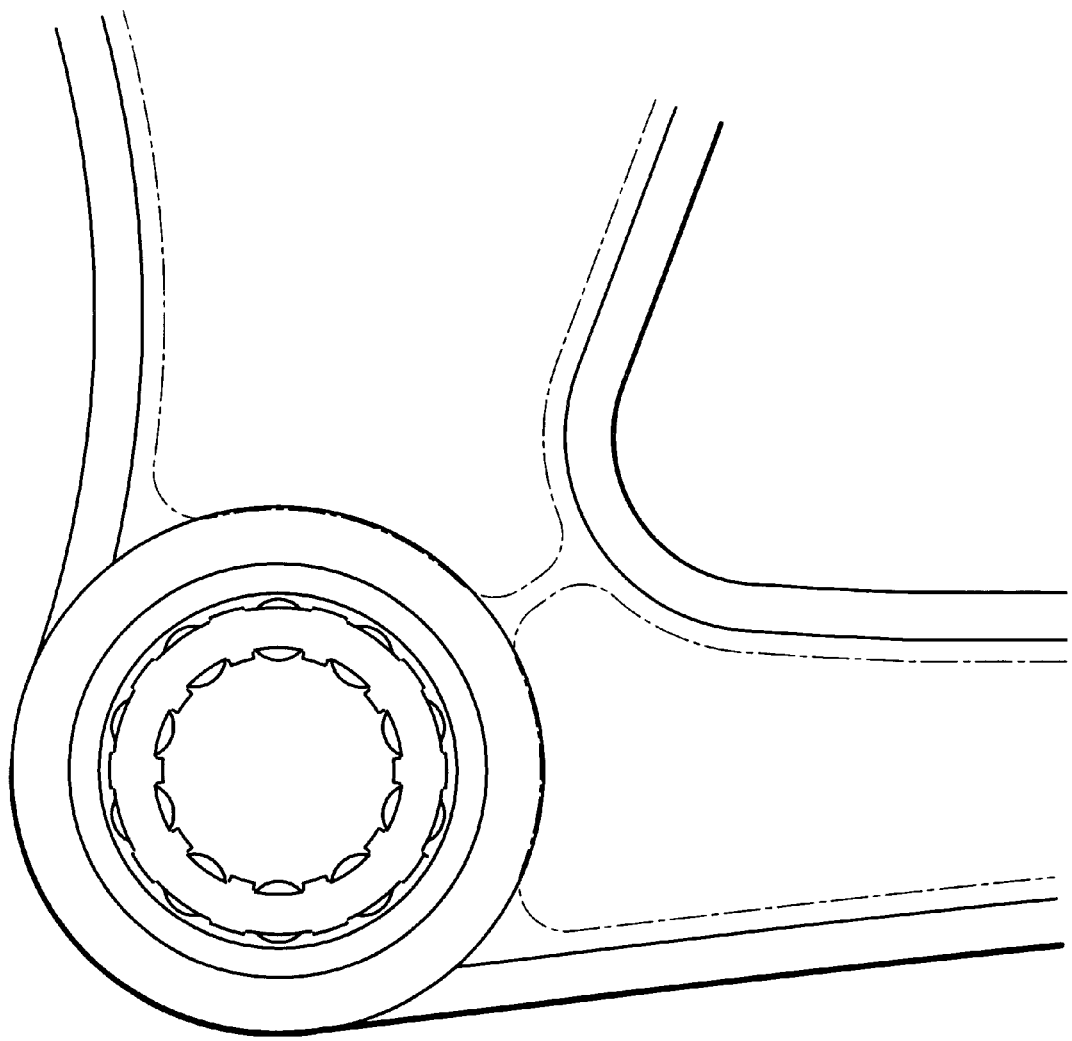
FIG. 19F shows a side view of FIG. 19E.

In the aspect of the frame relating to the bottom bracket, the joint may be similar to the steering head joint except that the joint may be a series of four concentric ribs (89), shown in FIGS. 19E–F, which when bonded form a solid ring of material surrounding the bottom bracket aperture. Naturally, other variations are possible. The bottom bracket may be completed by one of several methods depending upon the level of specification which is desired by the end consumer. In one instance, the bottom bracket may be formed by inserting a complete axle shaft, bearings, seals and outer cartridge shell. This complete cartridge may be inserted similar to the method described for the steering head reinforcing tube above. In another instance, the bearings may include only bearing retainer caps (91), as shown in FIG. 19E, and are inserted similarly to the head reinforcing tube except each side is inserted separately and they may or may not be connected in the middle. In order to complete the assembly, a bearing is assembled on a complete crankshaft, the sub-assembly is inserted through the bottom bracket assembly, and opposite side bearing is installed over the opposite crank arm, washers and locknuts are installed and tightened, completing the assembly. In a third instance, an internally threaded metal tube may be inserted as per the method described and at a later stage of assembly, a standardized cartridge of axle, bearings and seals is assembled into the captured tube and held in place by externally threaded nut holding devices.

Regarding the aspect of the frame relating to the seat mast receiver (100) area shown in FIG. 18, a seat mast reinforcing tube (not shown) may be similarly inserted into the seat mast receiver as described above for the steering head reinforcing tube. The method of insertion may be similar to the head reinforcing tube in that an internally expanding heating mandrel is inserted into the aperture, left in the thermoplastic frame for a period of time while the mandrel heats a shallow depth quickly, the mandrel is withdrawn and the seat mast reinforcing tube is inserted on a rigid, stub shaft with an internally expanding mandrel holding it in place until the thermoplastic cools and becomes rigid. (The stub shaft may be useful due to the closed end arrangement compared to the open end of the steering head.) The mandrel may then be collapsed and withdrawn.

In the aspect of attaching the rear wheel, toeplates (94) may be molded in place with each frame molded portion such that when the frame is bonded, the toeplates may be automatically positioned on each side of the frame ready for the assembly of a rear wheel.

Alternatively, the frame may not possess rear stays, but instead has a rear suspension arm attachment receiver, see FIG. 18V. This receiver may generally take the form of the bottom bracket and have a rear suspension receiver reinforcement tube, a complete cartridge, retainer caps or other appropriate attachment and bearing devices. This invention teaches and provides for a variety of locations as may be necessary for the variety of suspension designs as may be desired because of the ability to provide the local area of attachment with specific reinforcements and structural shapes (cross-sections).

Regarding the molding of the first and second molded portions (typically left and right body units), one aspect of the method used to mold the units relates to utilizing compression molding. Using this method, the mold is first filled and secondly closed. The mold halves typically do not close steel-to-steel but rather close upon the material itself until the determined compressing forces of the press are reached. This method may offer advantages as opposed to the more typical injection molding process, which is closed first and then filled with material. Thus, not only can the compressing pressure be changed to insure the part is fully formed, that is, by raising the compressing pressure, but more or less material can be added into the mold prior to compressing and still produce a quality part. This process allows making the part thicker in the direction of the mold closing (and heavier and stronger) or, in the inverse, thinner in the direction of the mold closing and lighter and less strong, but perhaps still more than adequate.

Another advantage of this feature is that raw materials with different cost/functional characteristics may be used to make products with significantly different performance and cost features and benefits. For example, a larger amount of material having lesser strength, but less expense, may be used to produce a heavier, lower cost product. For example, fiberglass/polypropylene may require about seven (7) pounds of material while the same mold can be utilized with a raw material that is perhaps ten times more expensive to make a lighter, stronger product. This example would include such materials as carbon/nylon, which is perhaps twice as strong while using perhaps 30–50% less material, resulting in a product weighing as little as four (4) pounds. Since weight and strength are of high importance to enthusiast cyclists, the increased functionality may be worth the increased cost.

The shape of the frame may vary according to the particular needs such as aesthetic design, stress, specialized applications, size, and so forth. One embodiment is sized according to the grid pattern of FIGS. 20–22 where the grid size is one inch squares. Other shapes and dimensions are certainly possible.

Figure 23:
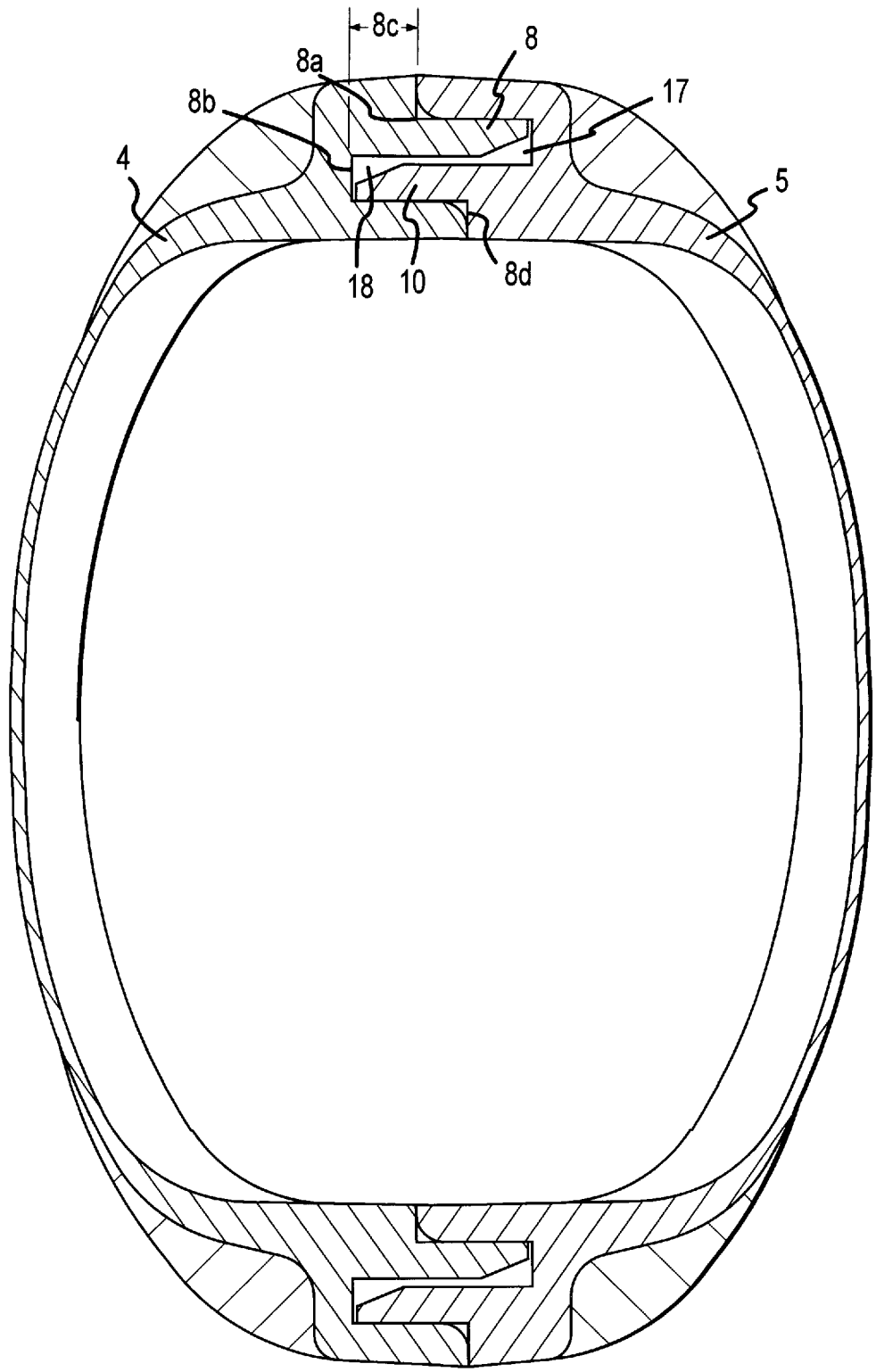
FIG. 23 shows an alternative embodiment of the shear bond joint of FIG. 4, having an additional flange.

FIG. 23 shows a typical cross section of a joint used in the bicycle frame. This joint, a variation of the joint of FIG. 4, or the joint of FIG. 4 may be used in a variety of locations, such as along the edges of the frame, at locations such as the steering head, bottom bracket, seat mast receiver, and so forth. Notice the recess face (8*a*), above flange (8) and the recess face (8*b*), below and adjacent to flange (8). The recess faces flank both sides of the flange (8), recede backward from the outward extension of flange (8), and are offset from each other (that is, at unequal distances from the central plane) by a distance (8*c*). A similar arrangement (and typically mating arrangement) may be provided on the first molded portion (4) and second molded portion (5). A self-aligning feature may be built into this type of joint. This is accomplished by providing a first recess (17) and a second recess (18) into which first and second flanges (8) and (10) fit. Just as the recesses and flanges assist in self-alignment in an up and down fashion viewed the perspective of FIG. 23, the dimensional aspects of the recesses and flanges may also assist in self-alignment in a left to right alignment viewed from FIG. 23. The applicant has realized that when such opposing surfaces as in the area of recess face (8*a*) and (8*d*) from the molded portions contact each other, the left to right alignment may also be more accurately achieved. This left to right alignment is useful for resolving parallelism trueness, flatness, and straightness in frames or, in wheels, generally known as "runout" or "wobble" in the biking industry.

Figure 24:
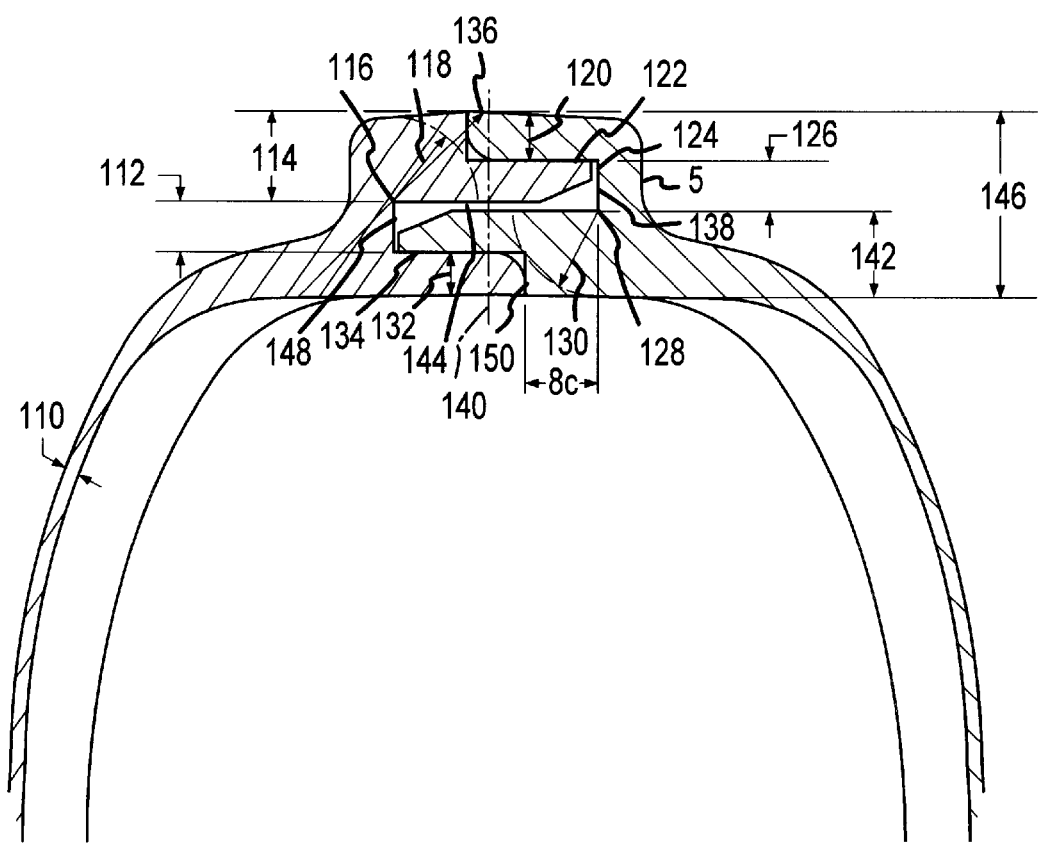
FIG. 24 shows a detail of the shear bond joint and design parameters.

Details of a typical joint used in this invention are shown in FIG. 24. This joint is similar to the one shown in FIG. 23, although its basic design considerations could be applied in a variety of shapes of shear bonds. One object of the shear joint is to provide at least an equal strength as the main body thickness (110). The thickness may vary according to the intensity of the application. More strength and the joint material is wasteful, less strength and the joint may fail prematurely. Thus, the main body thickness and material assists in determining several features of the shear bond joint. The below calculations and figures are not exclusive, but are exemplary of a joint. In some applications, the main body thickness (110) may be approximately 0.085" thick. Since a failure would be in tension typically in this section, a value of 15,000 psi for a typical plastic material may be used. However, since the joint itself may fail in shear, a value of 1,200 psi of shear area may be used. Thus, to provide sufficient surface area of a shear joint considering the tensile and shear stresses, a ratio of 15,000/1,200 may be used equaling 12.5. In this case with the body thickness of 0.085", the shear joint would be slightly over one inch long (12.5×0.085"=1.062"). The shear joint may be considered the length of the joint which is oriented approximately perpendicular to the centerline (140). Thus, the overall length of shear joint may be comprised in this example of the first shear length (122), second shear length (124), and third shear length (134), which may approximately equal 1.062". Naturally, more or less lengths could be used and each length could be varied.

The next step to be considered is the thickness of the shear bond joint (146), comprising the total of the first critical point thickness (114) and the second critical point thickness (142). In this embodiment, these two thicknesses may be equal. For the preferred embodiment, the thickness of the joint flange, (120, 126, 112, 132) generally should be made as thin as possible and as long as the molding process will allow. This criteria assists in building a thinner shear bond joint, because the overall thickness of the joint is largely determined by the minimum molding thickness possible and ratio of the maximum length of flange per unit thickness. In this case, the minimum flange thickness may be 0.085" and the maximum length of flange per unit thickness may be 5:1 resulting in a maximum flange length from recess to tip of 5×0.085"=0.425". However, this dimension of the flange length is shorter than the length needed for the shear bond length calculated above. Because the above calculated shear joint length is a minimum of 1.062", more than one shear joint may be required to obtain equal shear joint strength to main body strength. In order to provide a balanced joint relative to first molded portion and second molded portion, it is desirable (but without limitation) to have an odd number of shear joints, that is, n=1, 3, 5, and so forth. In this case, three shear joints (3×0.425"=1.275") is more than sufficient to satisfy the above calculated length of the shear bond of 1.062". The shear bond joint thickness (146) in this example may be the number of shear joints plus one (n+1=3+1=4) times the minimum flange thickness (112, 126, 132, 136) or (4×0.085")=0.340" plus 0.020" for joining material gap (144) to equal a shear bond total joint thickness (146) of 0.360".

It appears that there are two critical strength points, which may be positioned from the outside edges by a first critical point thickness (114) for the first critical strength point (116) and the second critical point thickness (142) for the second critical strength point (128). As mentioned above, for the shown joint, these thicknesses may be equal, so the distance may be 0.360"/2=0.180". It also appears that this distance is a critical distance to maintain from an adjacent shear loaded component face (items 136 and 150). Thus, a radius (items 118 and 130) may equal the critical point thickness of 0.180" and the shear loaded component faces may be spaced apart as shown from the critical strength point by at least such distance. That distance may also affect the offset distance (8*c*) discussed earlier between the two recess faces. By combining the different calculated quantities above, optimum joints may be constructed. The offset from the centerline of such faces as the shear loaded component faces can be determined by balancing the needed spatial requirements, thicknesses, and shear bond length In some instances, these distances may be approximately 0.210" offset from the centerline for the second and third shear loaded component faces (138) and (148) and 0.060" offset from the centerline for the first and fourth shear loaded component faces (136) and (150).

Experimental results have proven both in laboratory tests as well as functional field tests that the strength of the joint and the strength of the materials are well balanced, in that intentionally induced over stressing to a failure point shows approximately equal failures between the joint and base material. This evenly balanced failure mode may be considered the sign of a near perfectly designed joint.

Each of these bicycle component embodiments could include various facets of the present invention. Some may include bearings, while others may not include such elements. Some may include varieties of shear bond widths, tapers, and so forth. The market place and manufacturing concerns may dictate the appropriate embodiments for the present invention.

The foregoing discussion and the claims that follow describe only the preferred embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention.

Although the methods related to the system are being included in various detail, only initial claims directed toward the unique shear bond have been included. Naturally, those claims could have some application to the various other methods and apparatus claimed throughout the patent. The disclosure of the system or method context is sufficient to support the full scope of methods and apparatus claims with, for instance, the width of the shear bond, air tight seals, symmetrically opposite images, and others. While these may be added to explicitly include such details, the existing claims may be construed to encompass each of the other general aspects. Without limitation, the present disclosure should be construed to encompass subclaims, some of which are presented in a system or method context as described above for each of the other general aspects. In addition, to the extent any revisions utilize the essence of the invention, each would naturally fall within the breadth of protection encompassed by this patent. This is particularly true for the present invention since its basic concepts and understandings may be broadly applied.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, as an example, the disclosure of a "bond" should be understood to encompass disclosure of the act of "bonding"—whether explicitly discussed or not—and, conversely, were there only disclosure of the act of "bonding", such a disclosure should be understood to encompass disclosure of a "bond." Such changes and alternative terms are to be understood to be explicitly included in the description.

It is simply not practical to describe in the claims all the possible embodiments to the present invention which may be accomplished generally in keeping with the goals and objects of the present invention and this disclosure and which may include separately or collectively such aspects as creating at least a first molded portion where the first molded portion has a first bonding surface oriented substantially perpendicular to the central plane, creating at least a second molded portion where the second molded portion has a second bonding surface oriented substantially perpendicular to the central plane, joining at least the first molded portion to the second molded portion and bonding at least the first molded portion to the second molded portion through a shear bond which substantially joins the first and second bonding surfaces perpendicular to the central plane, and other aspects of the present invention. While these may be added to explicitly include such details, the existing claims should be construed to encompass such aspects. To the extent the methods claimed in the present invention are not farther discussed, they are natural outgrowths of the system or apparatus claims. Therefore, separate and further discussion of the methods are deemed unnecessary as they otherwise claim steps that are implicit in the use and manufacture of the system or the apparatus claims. Furthermore, the steps are organized in a more logical fashion; however, other sequences can and do occur. Therefore, the method claims should not be construed to include only the order of the sequence and steps presented.

Furthermore, any references mentioned in the application for this patent as well as all references listed in any information disclosure originally filed with the application are hereby incorporated by reference. However, to the extent statements might be considered inconsistent with the patenting of this/these invention(s), such statements are expressly not to be considered as made by the applicant(s).

I claim:

1. A molded structural bicycle component assembly having a central plane comprising:
   a. a first molded portion comprising:
      i. an upper flange;
      ii. a middle recess below said upper flange; and
      iii. a lower flange below said middle recess;
   b. a second molded portion comprising:
      i. an upper flanking offset recess face;
      ii. a middle flange below said upper offset recess face; and
      iii. a lower flanking offset recess face below said middle flange
      wherein said upper flanking offset recess face is offset with respect to a central plane from said lower flanking offset recess face by a distance;
   c. at least one perpendicular shear bond having a bond width substantially perpendicular to said central plane which joins said first and second portions together wherein said shear bond is substantially perpendicular to said central plane.

2. A molded structural bicycle component assembly as described in claim 1 wherein said molded structural bicycle component assembly defines a width at every point and wherein said perpendicular shear bond has a total width which is greater than the width of the molded structural bicycle component assembly in the vicinity of said perpendicular shear bond.

3. A molded structural bicycle component assembly as described in claim 1 wherein said perpendicular shear bond extends across said central plane.

4. A molded structural bicycle component assembly as described in claim 1 wherein said first and second molded portions have inner surfaces defining a folding line and wherein said inner surfaces are symmetrically opposite images about said folding line.

5. A molded structural bicycle component assembly as described in claim 4 and further comprising a compression element to compress a portion of one of said molded portions into a portion of the other said molded portion and which acts with a force parallel to said central plane.

6. A molded structural bicycle component assembly as described in claim 4 wherein said middle flange acts with a force parallel to said central plane when said first molded portion and said second molded portion are joined.

7. A molded structural bicycle component assembly as described in claim 1 wherein said molded structural bicycle component assembly comprises a molded wheel assembly.

8. A molded structural bicycle component assembly as described in claim 7 wherein said first and second molded portions each comprise a hub portion on said central axis and a hub bond oriented along said hub portion.

9. A molded structural bicycle component assembly as described in claim 7 wherein said first and second molded portions comprise a first and second rim portion respectively and wherein each rim portion comprises:
  a. an inner rim surface;
  b. an outer rim surface which is further from said central axis than said inner rim surface;
  c. an interior surface; and
  d. a semicircular boundary extending from said outer rim surface to said inner rim surface at one location along said interior surface;
  wherein the location of the semicircular boundary of said second rim portion corresponds to the location of the semicircular boundary of said first rim portion so as to form a single hole when said first and second rim portions are joined.

10. A molded structural bicycle component assembly as described in claim 1 and further comprising a compression element to compress a portion of one of said molded portions into a portion of the other said molded portion and which acts with a force parallel to said central plane.

11. A molded structural bicycle assembly as described in claim 10 wherein said compression element is integral to at least one of said molded portions.

12. A molded structural bicycle component assembly as described in claim 1 further comprising an integral bearing connected to said assembly.

13. A molded structural bicycle component assembly as described in claim 12 wherein said integral bearing is a molded bearing.

14. A molded structural bicycle component assembly as described in claim 1 and further comprising an electromagnetically active material in the vicinity of said perpendicular shear bond.

15. A molded structural bicycle component assembly as described in claim 1 wherein said shear bond comprises an engaged area formed by said middle recess of said first molded section engaged with some portion of said middle flange of said second molded portion between said upper and lower flanking offset recess faces.

16. A molded structural bicycle component assembly as described in claim 1 wherein said first molded portion further comprises an inner recess positioned inward of said lower flange and said second molded portion further comprises an inner flange inward of said lower flanking offset recess face and adapted to engage said inner recess.

17. A molded structural bicycle component assembly as described in claim 16 wherein said inner recess is offset with respect to said central plane by a distance.

18. A molded wheel assembly having a central axis perpendicular to a central plane comprising:
  a. a first molded portion comprising a first rim portion wherein said first rim portion comprises:
    i. an upper flange;
    ii. a middle recess below said upper flange; and
    iii. a lower flange below said middle recess
    wherein said upper flange and said middle recess and said lower flange form said first rim portion;
  b. a second molded portion comprising a second rim portion wherein said second rim portion comprises:
    i. an upper flanking offset recess face;
    ii. a middle flange below said upper offset recess face; and
    iii. a lower flanking offset recess face below said middle flange
    wherein said upper flanking offset recess face and said middle flange and said lower flanking offset recess face form said second rim portion and wherein said upper flanking offset recess face is offset with respect to a central plane from said lower flanking offset recess face by a distance; and
  c. at least one perpendicular shear bond having a bond width substantially perpendicular to said central plane which joins said first and second portions together wherein said shear bond is substantially perpendicular to said central plane.

19. A molded wheel assembly as described in claim 18 wherein said shear bond comprises:
  a. an airtight rim shear bond integral to said first and second rim portions of said first and second molded portions; and
  b. an engaged area formed by said middle recess of said first molded section engaged with some portion of said middle flange of said second molded portion between said upper and lower flanking offset recess faces
  wherein said airtight rim shear bond and said engaged area form a bonded rim portion.

20. A molded wheel assembly as described in claim 18 further comprising a rim case attached to said first and second molded portions.

21. A molded wheel assembly as described in claim 20 further comprising an angled interface between said rim case and said first and second molded portions.

* * * * *